US009065146B2

(12) United States Patent
Onuki et al.

(10) Patent No.: US 9,065,146 B2
(45) Date of Patent: Jun. 23, 2015

(54) NONAQUEOUS ELECTROLYTE AND LITHIUM SECONDARY BATTERY EMPLOYING THE SAME

(75) Inventors: Masamichi Onuki, Ibaraki (JP); Minoru Kotato, Ibaraki (JP); Isao Konno, Ibaraki (JP); Shinichi Kinoshita, Ibaraki (JP); Noriko Shima, Ibaraki (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 184 days.

(21) Appl. No.: 12/489,010

(22) Filed: Jun. 22, 2009

(65) Prior Publication Data
US 2010/0021823 A1 Jan. 28, 2010

Related U.S. Application Data

(60) Division of application No. 11/735,051, filed on Apr. 13, 2007, now Pat. No. 7,575,833, which is a continuation of application No. 10/935,279, filed on Sep. 8, 2004, now Pat. No. 7,223,502, which is a continuation of application No. PCT/JP03/02741, filed on Mar. 7, 2003.

(30) Foreign Application Priority Data

| Mar. 8, 2002 | (JP) | 2002-063545 |
|---|---|---|
| Mar. 8, 2002 | (JP) | 2002-063547 |
| Aug. 21, 2002 | (JP) | 2002-240382 |
| Oct. 10, 2002 | (JP) | 2002-297359 |
| Jan. 9, 2003 | (JP) | 2003-003268 |

(51) Int. Cl.
| H01M 10/0525 | (2010.01) |
| H01M 6/16 | (2006.01) |
| H01M 10/0567 | (2010.01) |
| H01M 4/131 | (2010.01) |
| H01M 4/133 | (2010.01) |
| H01M 4/525 | (2010.01) |
| H01M 4/587 | (2010.01) |

(52) U.S. Cl.
CPC .......... *H01M 10/0525* (2013.01); *H01M 6/168* (2013.01); *H01M 4/131* (2013.01); *H01M 4/133* (2013.01); *H01M 4/525* (2013.01); *H01M 4/587* (2013.01); *H01M 10/0567* (2013.01); *Y02E 60/122* (2013.01)

(58) Field of Classification Search
CPC ................ H01M 10/0525; H01M 10/0567; H01M 6/168; Y02E 60/122
USPC ......... 429/339, 340, 341, 199, 200; 252/62.2, 252/364
See application file for complete search history.

(56) References Cited

U.S. PATENT DOCUMENTS

| 6,432,585 B1 | 8/2002 | Kawakami et al. |
| 6,509,123 B1 | 1/2003 | Shibuya et al. |
| 6,833,219 B2 | 12/2004 | Lee et al. |
| 6,905,762 B1 | 6/2005 | Jow et al. |
| 2001/0038949 A1 | 11/2001 | Hatazaki et al. |
| 2002/0039677 A1 | 4/2002 | Iwamoto et al. |
| 2002/0102466 A1 | 8/2002 | Hwang et al. |
| 2002/0197537 A1 | 12/2002 | Kim et al. |
| 2003/0113634 A1 | 6/2003 | Oh et al. |

FOREIGN PATENT DOCUMENTS

| CN | 1277468 | 12/2000 |
| JP | 03-236169 | 10/1992 |
| JP | 8-45545 | 2/1996 |
| JP | 9-245834 | 9/1997 |
| JP | 10-112335 | 4/1998 |
| JP | 11-040193 A | 2/1999 |
| JP | 11-233140 | 8/1999 |
| JP | 11-242954 A | 9/1999 |
| JP | 11-329496 | 11/1999 |
| JP | 2000-106209 | 4/2000 |
| JP | 2000-133304 | 5/2000 |
| JP | 2001-43895 | 2/2001 |
| JP | 2001-97944 | * 4/2001 |
| JP | 2001-167797 A | 6/2001 |
| JP | 2001-176548 | 6/2001 |
| JP | 2001-185213 | 7/2001 |
| JP | 2001-256996 | 9/2001 |
| JP | 2001-313071 | 11/2001 |
| JP | 2001-357877 | 12/2001 |
| JP | 2002-008716 | 1/2002 |
| JP | 2002-33120 A | 1/2002 |

(Continued)

OTHER PUBLICATIONS

U.S. Appl. No. 13/209,149, filed Aug. 12, 2011, Kotato, et al.
U.S. Appl. No. 13/397,197, filed Feb. 15, 2012, Kotato, et al.
U.S. Appl. No. 13/408,436, filed Feb. 29, 2012, Onuki, et al.
U.S. Appl. No. 13/489,038, filed Jun. 5, 2012, Kotato, et al.
Office Action mailed Aug. 31, 2010, in Japanese Patent Application (Continued)

*Primary Examiner* — Laura Weiner

(74) *Attorney, Agent, or Firm* — Oblon, McClelland, Maier & Neustadt, L.L.P.

(57) ABSTRACT

The invention relates to a nonaqueous electrolyte which comprises a nonaqueous organic solvent and a lithium salt dissolved therein, wherein the nonaqueous organic solvent contains at least one compound selected from the group consisting of acid anhydrides and carbonic esters having an unsaturated bond, and at least one compound selected from the group consisting of sulfonic compounds and fluorine-containing aromatic compounds having 9 carbon atoms or less; and a lithium secondary battery employing the same.

9 Claims, 1 Drawing Sheet

(56) References Cited

FOREIGN PATENT DOCUMENTS

| JP | 2002-83629 | 3/2002 |
| JP | 2002-083629 A | 3/2002 |
| JP | 2002-134170 | 5/2002 |
| JP | 2002-175802 A | 6/2002 |
| JP | 2002-190316 A | 7/2002 |
| JP | 2002-231307 | 8/2002 |
| JP | 2002-280063 * | 9/2002 |
| JP | 2003-163032 A | 6/2003 |

OTHER PUBLICATIONS

No. JP 2003-194426, filed Jul. 9, 2003 (w/English-language translation).

U.S. Appl. No. 12/957,698, filed Dec. 1, 2010, Kotato, et al.

* cited by examiner

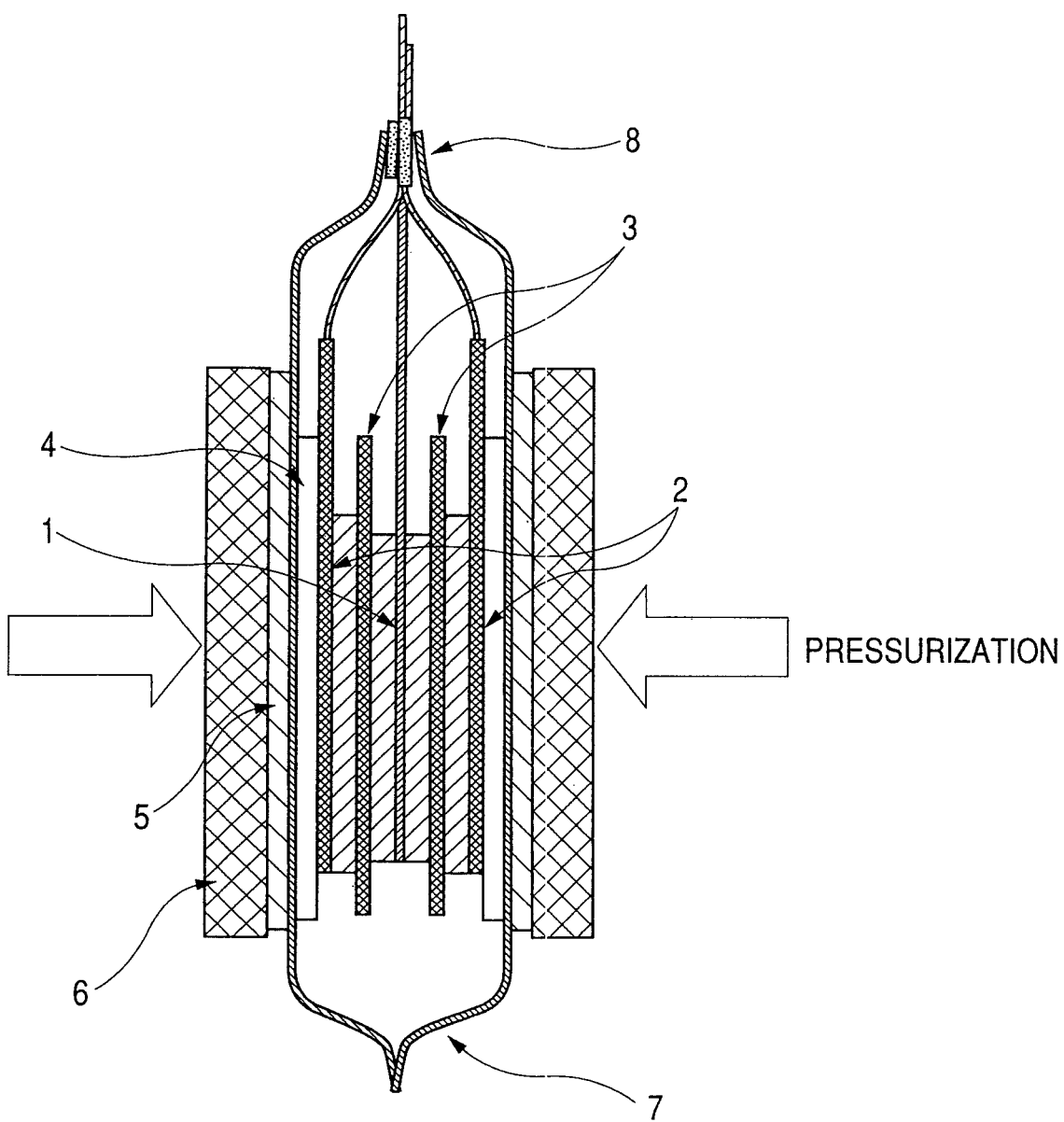

NONAQUEOUS ELECTROLYTE AND LITHIUM SECONDARY BATTERY EMPLOYING THE SAME

CROSS-REFERENCE TO RELATED APPLICATIONS

The present application is a division of U.S. Ser. No. 11/735,051, filed Apr. 13, 2007, which is now U.S. Pat. No. 7,575,833, which is a continuation of U.S. Ser. No. 10/935, 279, filed on Sep. 8, 2004, which is now U.S. Pat. No. 7,223, 502, which is a continuation of PCT/JP03/02741, filed on Mar. 7, 2003, which claims priority to JP 2002-063545, filed on Mar. 8, 2002, JP 2002-063547, filed on Mar. 8, 2002, JP 2002-240382, filed on Aug. 21, 2002, JP 2002-297359, filed on Oct. 10, 2002, and JP 2003-003268, filed on Jan. 9, 2003.

FIELD OF THE INVENTION

The present invention relates to a nonaqueous electrolyte and a lithium secondary battery employing the same. More specifically, the invention relates to a nonaqueous electrolyte secondary battery of high capacity that is excellent in discharge characteristics after continuous charging, storage characteristics, load characteristics, and cycle characteristics and that reduces gas generation, and a nonaqueous electrolyte for use in the battery.

BACKGROUND ART

With the recent trend toward weight reduction and size reduction in electrical products, development of a lithium secondary battery having a high energy density has now been in progress. There is also a desire for improvements in various battery characteristics as a result of the spread of fields to which lithium secondary batteries are applied.

Moreover, in the case that a lithium secondary battery is used as a backup power source at the time of the power failure or a power source for portable devices, in order to compensate self-discharge, there is usually used a continuous charge method (trickle charge) in which a very weak current is always applied to maintain the battery in a charged state.

A secondary cell using metal lithium as the negative electrode suffers from a problem that metallic lithium grows up to form dendrite after repeated charging/discharging, and the dendrite reaches the positive electrode to thereby cause short-circuit failure inside the cell, which is a largest obstacle to the practical use of the lithium secondary cell using metal lithium as the negative electrode. On the contrary, in the case of a nonaqueous electrolyte secondary battery using as a negative active material a carbonaceous material such as coke, artificial graphite or natural graphite capable of intercalating or releasing lithium, lithium does not grow up to dendrite and hence battery life and safety can be improved. In particular, a nonaqueous electrolyte secondary battery using a graphite-based carbonaceous material such as artificial graphite or natural graphite attracts attention as a battery capable of satisfying the requirement of high capacity.

However, in the secondary battery having a negative electrode of a graphite-based carbonaceous material, the electrolyte may decompose on the surface of the electrode during charging and discharging and thus decreased efficiency of charging and discharging, decreased cycle characteristics, increased inner pressure of the battery caused by generated gas, and the like may be sometimes induced.

As a method for obtaining a battery of high capacity, for the purpose of increasing the amount of active material of the electrode, it is general to densify an electrode layer by pressurization in order to reduce the voids in the electrode layer formed on the current collector of the electrode as far as possible. However, when the voids in the battery are reduced, the inner pressure of the battery remarkably increases even when the amount of gas generation by the decomposition of the electrolyte is only a little.

Therefore, with regard to the lithium secondary battery, it is required to suppress the decomposition of the electrolyte on the electrode surface.

In order to suppress the electrolyte of the nonaqueous electrolyte secondary battery using a graphite-based negative electrode, it is proposed to use a nonaqueous solvent containing a cyclic carbonic ester having a carbon-carbon unsaturated bond in the molecule, such as vinylene carbonate or a derivative thereof (e.g., see Patent Document 1). When the nonaqueous solvent is used, a film formed by reductive decomposition of the cyclic carbonic ester having an unsaturated bond on the surface of the negative electrode can suppress excessive decomposition of the nonaqueous solvent to thereby improve cycle characteristics. However, from the experiments of the present inventors, it has been revealed that the secondary battery using a nonaqueous solvent containing a cyclic carbonic ester having a carbon-carbon unsaturated bond in the molecule has a problem that gas generation increases when continuous charging is conducted, although it exhibits excellent cycle characteristics. It seems that this is because gas generation does not decrease because activity of the positive electrode does not decrease in the continuous charging in which charging is continued at a constant voltage.

In such a situation, there have been reported numerous methods of adding various additives for improving initial capacity, rate characteristics, cycle characteristics, high-temperature storage characteristics, low-temperature characteristics, continuous charge characteristics, self-discharge characteristics, overcharge-preventing characteristics, and the like. For example, as methods for improving cycle characteristics, there are disclosed the addition of a divalent sulfonate compound such as 1,4-butanediol dimethanesulfonate or propylene glycol dimethanesulfonate (e.g., see Patent Documents 2 and 3), the incorporation of an alkanesulfonic alkyl ester (otherwise, alkyl alkanesulfonate) (e.g., see Patent Document 4), and the fact that a cycle capacity is increased by incorporating a silyl sulfate such as bis(trialkylsilyl) sulfate (e.g., see Patent Document 5).

Moreover, it is reported that the incorporation of 1,4-thioxane-1,1-dioxide in the electrolyte results in the formation of a complex of cobalt eluted from a positive electrode with 1,4-thioxane-1,1-dioxide to stabilize the cobalt ion and to suppress the precipitation of cobalt on the negative electrode and, as a result, the decomposition of the electrolyte is suppressed and high-temperature storage and high-temperature charge/discharge cycle characteristics are improved (e.g., see Patent Document 6). In addition, an electrolyte containing a compound having a molecular weight of less than 500 and having an NS structure in which nitrogen and sulfur are bonded is also reported (i.e., see Patent Document 7).

Furthermore, in order to improve battery characteristics, safety and the like, the incorporation of a fluorine-containing aromatic compound in the nonaqueous solvent is known (i.e., see Patent Documents 8 to 13). However, a method for suppressing gas generation at continuous charging is not described in any of the literatures.

As a method for improving battery characteristics at continuous charging, a secondary battery using an electrolyte containing a phosphoric ester is proposed (e.g., see Patent Document 14). However, based on the experiments of the present inventors, the battery is insufficient in battery characteristics after continuous charging.
[Patent Document 1]
   JP-A-8-45545
[Patent Document 2]
   JP-A-2000-133304
[Patent Document 3]
   JP-A-2001-313071
[Patent Document 4]
   JP-A-9-245834
[Patent Document 5]
   JP-A-2001-176548
[Patent Document 6]
   JP-A-2002-134170
[Patent Document 7]
   JP-A-2002-280063
[Patent Document 8]
   JP-A-10-112335
[Patent Document 9]
   JP-A-11-329496
[Patent Document 10]
   JP-A-2000-106209
[Patent Document 11]
   JP-A-2001-185213
[Patent Document 12]
   JP-A-2001-256996
[Patent Document 13]
   JP-A-2002-83629
[Patent Document 14]
   JP-A-11-233140

Recently, a higher performance for a lithium secondary battery has been increasingly required. That is, it is required to satisfy various characteristics such as high capacity, cycle characteristics, high-temperature storage characteristics, and continuous charge characteristics at a high level. In particular, since mobile products are frequently utilized out of doors and a demand for office notebook-size personal computers is increasing, the improvement of continuous charge characteristics is particularly much desired in recent years.

At the time when notebook-size personal computers are used in offices, AC adaptors are used as power sources in most cases and hence the secondary batteries in the personal computers are continuously charged. In such continuous charging, gas generates owing to the decomposition of the electrolyte. In the case of a cylindrical battery in which a safety valve is actuated with detecting inner pressure at an abnormal event such as overcharge, the safety valve may be actuated at continuous charging when a large amount of gas generates.

Moreover, in a prismatic battery without a safety valve, when the amount of gas is large, it becomes necessary to house bare cells in a larger case so that no change is observed in appearance, which leads to decrease in energy density of the whole battery pack. When the gas generation is much more, there is a risk of case burst.

Therefore, with regard to the continuous charge characteristics, not only high recovered capacity and small capacity degradation after test but also suppression of gas generation during the charging are strongly required. However, the electrolytes hitherto proposed have often provided no improvement of battery characteristics such as the continuous charge characteristics.

For example, the use of the electrolyte containing an alkanesulfonic alkyl ester disclosed in the above Patent Document 4 improves capacity deterioration but the improvement is only a small degree and no effect on the improvement of the continuous charge characteristics is exhibited.

Moreover, since the silyl sulfates disclosed in Patent Document 5 are highly corrosive and react with cell current collectors, storage characteristics, particularly at a high temperature is deteriorated when the compounds are incorporated in electrolytes. Furthermore, the toxicity of the silyl sulfates is unclear in many points but based on the inference from the fact that dimethyl sulfate, which is an analogous compound, is regulated by the Ordinance on Prevention of Hazards Due to Specified Chemical Substances owing to its strong corrosiveness and toxicity to central nerve system, it may induce a great risk in safety to incorporate them in electrolytes.

The electrolyte containing 1,4-thioxane-1,1-dioxide (Patent Document 6) improves the capacity deterioration during high-temperature storage but the improvement is only a small degree and no effect on the improvement of the continuous charge characteristics is exhibited.

Furthermore, 1,1'-sulfonyldiimidazole, N-bismethylthiomethylene-p-toluenesulfonamide, and 1-p-tolylsulfonylpyrrole disclosed in Patent Document 7 cannot improve both of the storage characteristics at a relatively high temperature of 80° C. or higher and the continuous charge characteristics.

Accordingly, it is also required to improve the continuous charge characteristics in addition to high capacity, high-temperature storage characteristics, load characteristics, and cycle characteristics. As the continuous charge characteristics, not only reduction of capacity deterioration but also suppression of gas generation is strongly requested.

DISCLOSURE OF THE INVENTION

As a result of the extensive studies for achieving the above objects, the present inventors have found that the above problems can be solved by incorporating a specific compound in the electrolyte, and thus the invention has been accomplished.

Namely, the gist of the invention lies in a nonaqueous electrolyte comprising a nonaqueous organic solvent and a lithium salt dissolved therein, wherein the nonaqueous organic solvent comprises at least one compound selected from the group consisting of acid anhydrides and carbonic esters having an unsaturated bond, and at least one compound selected from the group consisting of [A] and [B], or in a lithium secondary battery employing the same.

[A]: Sulfonic Compounds Represented by any One of the Following Formulae (1) to (5):

(1)

wherein $L^1$ represents a $Z^1$-valent connecting group composed of carbon atom(s) and hydrogen atoms, $R^1$ represents a hydrocarbon group, and $Z^1$ is an integer of 3 or more;

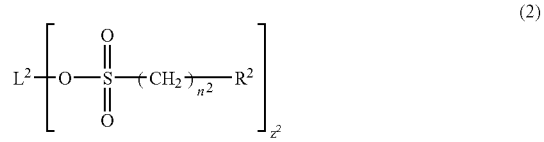

(2)

wherein $L^2$ represents a $Z^2$-valent connecting group composed of carbon atom(s) and hydrogen atoms, $R^2$ represents a fluorinated aliphatic saturated hydrocarbon group, $n^2$ is an integer of 1 or more, and $Z^2$ is an integer of 2 or more;

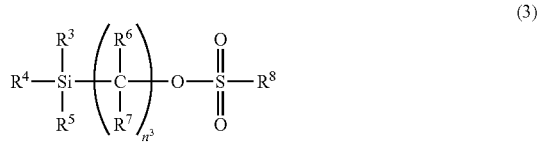

(3)

wherein each of $R^3$ to $R^7$ independently represents a hydrogen atom or a hydrocarbon group having 1 to 8 carbon atoms, $R^8$ represents a hydrocarbon group having 1 to 8 carbon atoms, and $n^3$ represents an integer of 0 to 4;

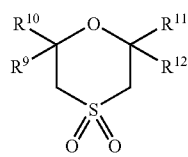

(4)

wherein each of $R^9$ to $R^{12}$ independently represents a hydrogen atom or a hydrocarbon group having 1 to 8 carbon atoms, or $R^9$ and $R^{10}$, $R^{11}$ and $R^{12}$ each may be combined with each other to form a ring and $R^{10}$ and $R^{11}$ may be also combined with each other; and

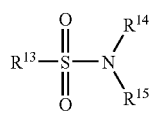

(5)

wherein each of $R^{13}$ to $R^{15}$ independently represents an alkyl group having 1 to 12 carbon atoms which may be substituted with fluorine atom(s), an alkenyl group having 2 to 12 carbon atoms which may be substituted with fluorine atom(s), an aryl group having 6 to 12 carbon atoms which may be substituted with fluorine atom(s), or an aralkyl group having 7 to 12 carbon atoms which may be substituted with fluorine atom(s), or $R^{14}$ and $R^{15}$ may be combined with each other to form a nitrogen-containing aliphatic ring and $R^{13}$ and $R^{14}$ may be combined with each other to form a cyclic structure;
[B]: Fluorine-Containing Aromatic Compounds Having 9 Carbon Atoms or Less.

The use of the electrolyte comprising at least one compound selected from the group consisting of acid anhydrides and carbonic esters having an unsaturated bond, and at least one compound selected from the group consisting of the above [A] and [B] improves high-temperature storage characteristics and continuous charge characteristics with maintaining excellent cycle characteristics and high capacity. Specifically, self-discharge hardly occurs during the exposure to a high temperature, the recovered capacity after the exposure is improved, and also the recovered capacity after continuous charging for a long period can be remarkably improved.

The detail of the reason why the electrolyte according to the invention provides the improvement of high-temperature storage characteristics and continuous charge characteristics is unclear but the fact that a surface protecting film (hereinafter sometimes referred to as "SEI") formed on the negative electrode at the initial stage of charging is thermally stable is considered to contribute. When the SEI inhibiting the reaction between lithium and the electrolyte at the negative electrode is thermally unstable, the reaction between lithium and the electrolyte proceeds to cause capacity deterioration. A nonaqueous solvent represented by a saturated carbonic ester is reduced at the initial stage of charging to form SEI and, at that time, at least one compound selected from the group consisting of [A] and [B] is in part reduced and incorporated into SEI. It is presumed that SEI becomes stronger by the presence of reduced products of both of at least one compound selected from the group consisting of [A] and [B] and the compound selected from acid anhydrides and carbonic esters having an unsaturated bond.

Moreover, when at least one compound selected from the above [A] is added, it is considered that the remaining compound not reduced at the initial stage of charging acts as an acid to cover the basic point of the positive active material and thereby the reaction between the positive active material and the electrolyte, which generates gases such as carbon dioxide, is inhibited.

BRIEF DESCRIPTION OF THE DRAWINGS

FIG. 1 is a schematic cross-sectional view illustrating the structure of a sheet-form lithium secondary battery obtained by carrying out the invention.

With regard to the symbols in the drawing, 1 is a positive electrode, 2 is a negative electrode, 3 is a separator, 4 is a PET film, 5 is a silicone rubber, 6 is a glass plate, 7 is a laminate film, and 8 is a lead with a sealant.

BEST MODE FOR CARRYING OUT THE INVENTION

The following will describe modes for carrying out the invention in detail.

The nonaqueous electrolyte according to the invention comprises a nonaqueous organic solvent and a lithium salt dissolved therein, and further contains at least one compound selected from among [A] and [B].
[A] Sulfonic Compounds:
Sulfonic compounds of [A] group are selected from the following formulae (1) to (5):

(1)

wherein $L^1$ represents a $Z^1$-valent connecting group composed of carbon atom(s) and hydrogen atoms, $R^1$ represents a hydrocarbon group, and $Z^1$ is an integer of 3 or more;

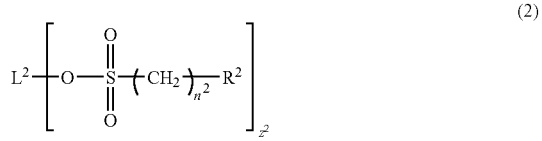

(2)

wherein $L^2$ represents a $Z^2$-valent connecting group composed of carbon atom(s) and hydrogen atoms, $R^2$ represents a fluorinated aliphatic saturated hydrocarbon group, $n^2$ is an integer of 1 or more, and $Z^2$ is an integer of 2 or more;

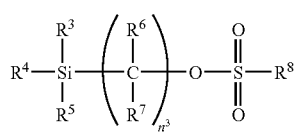

(3)

wherein each of $R^3$ to $R^7$ independently represents a hydrogen atom or a hydrocarbon group having 1 to 8 carbon atoms, $R^8$ represents a hydrocarbon group having 1 to 8 carbon atoms, and $n^3$ represents an integer of 0 to 4;

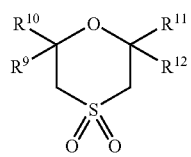

(4)

wherein each of $R^9$ to $R^{12}$ independently represents a hydrogen atom or a hydrocarbon group having 1 to 8 carbon atoms, or $R^9$ and $R^{10}$, $R^{11}$ and $R^{12}$ each may be combined with each other to form a ring and $R^{10}$ and $R^{11}$ may be also combined with each other; and

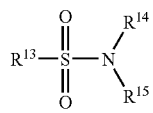

(5)

wherein each of $R^{13}$ to $R^{15}$ independently represents an alkyl group having 1 to 12 carbon atoms which may be substituted with fluorine atom(s), an alkenyl group having 2 to 12 carbon atoms which may be substituted with fluorine atom(s), an aryl group having 6 to 12 carbon atoms which may be substituted with fluorine atom(s), or an aralkyl group having 7 to 12 carbon atoms which may be substituted with fluorine atom(s), or $R^{14}$ and $R^{15}$ may be combined with each other to form a nitrogen-containing aliphatic ring and $R^{13}$ and $R^{14}$ may be combined with each other to form a cyclic structure.

In the above formula (1), $R^1$ represents a hydrocarbon group. Examples of the hydrocarbon group include alkyl groups having 1 to 4 carbon atoms, such as a methyl group, an ethyl group, a propyl group, an isopropyl group, and a butyl group; alkenyl groups having 2 to 4 carbon atoms, such as a vinyl group, an isopropenyl group, and an allyl group; aryl groups having 6 to 9 carbon atoms, such as a phenyl group, a tolyl group, an ethylphenyl group, a dimethylphenyl group, and trimethylphenyl group; aralkyl groups having 7 to 8 carbon atoms, such as benzyl group and a phenethyl group. Preferred are alkyl groups having 1 to 2 carbon atoms, such as a methyl group and an ethyl group, and aryl groups having 6 to 9 carbon atoms, such as a phenyl group, a tolyl group, an ethylphenyl group, a dimethylphenyl group, and trimethylphenyl group, and more preferred are a methyl group and a tolyl group.

Moreover, the above $Z^1$ represents an integer of 3 or more, and is preferably 3 or 4. Furthermore, $L^1$ represents a $Z^1$-valent connecting group composed of carbon atom(s) and hydrogen atoms. The number of the carbon atoms constituting the connecting group $L^1$ is preferably 3 to 12, more preferably 3 to 8.

When the above $Z^1$ is 3, $L^1$ represents a trivalent connecting group composed of carbon atoms and hydrogen atoms. The following will exemplify the group.

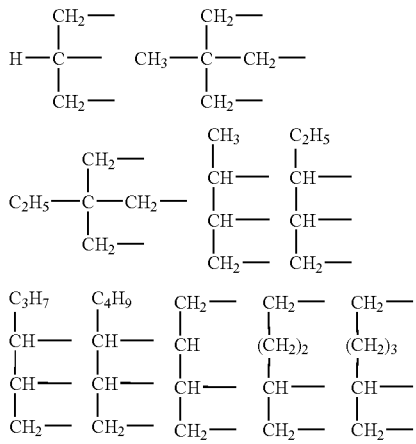

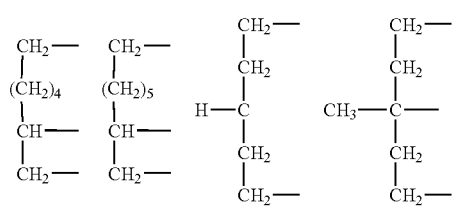

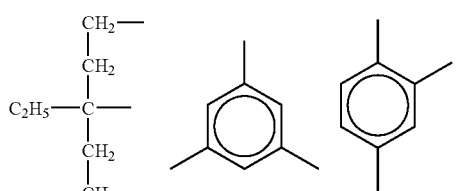

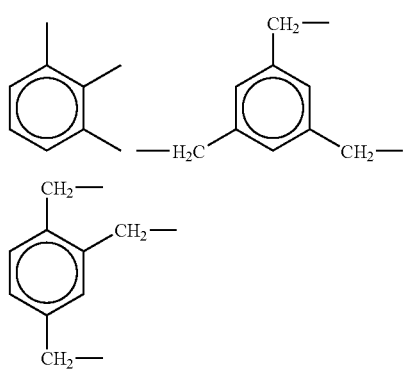

Moreover, when the above $Z^1$ is 4, $L^1$ represents a tetravalent connecting group composed of carbon atoms and hydrogen atoms. The following will exemplify the group.

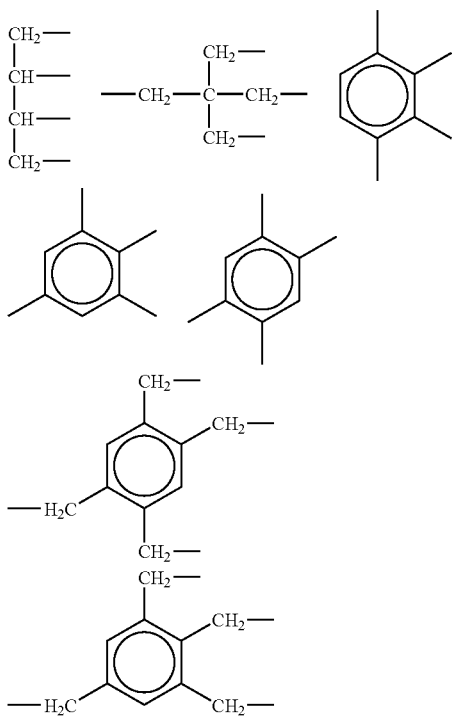

Examples of the multivalent sulfonate compound represented by the above formula (1) include trivalent sulfonates, e.g., 1,2,3-propanetriol trisulfonates such as 1,2,3-propanetriol trimethanesulfonate, 1,2,3-propanetriol triethanesulfonate, 1,2,3-propanetriol tripropanesulfonate, 1,2,3-propanetriol tributanesulfonate, 1,2,3-propanetriol tribenzenesulfonate, 1,2,3-propanetriol tri-p-toluenesulfonate, 1,2,3-propanetriol tri-4-ethylbenzenesulfonate, 1,2,3-propanetriol tris-3,5-dimethylbenzenesulfonate, and 1,2,3-propanetriol tri-2-mesitylenesulfonate, 1,2,3-butanetriol trisulfonates such as 1,2,3-butanetriol trimethanesulfonate, 1,2,3-butanetriol triethanesulfonate, 1,2,3-butanetriol tripropanesulfonate, 1,2,3-butanetriol tributanesulfonate, 1,2,3-butanetriol tribenzenesulfonate, 1,2,3-butanetriol tri-p-toluenesulfonate, 1,2,3-butanetriol tri-4-ethylbenzenesulfonate, 1,2,3-butanetriol tris-3,5-dimethylbenzenesulfonate, and 1,2,3-butanetriol tri-2-mesitylenesulfonate, 1,2,4-butanetriol trisulfonates such as 1,2,4-butanetriol trimethanesulfonate, 1,2,4-butanetriol triethanesulfonate, 1,2,4-butanetriol tripropanesulfonate, 1,2,4-butanetriol tributanesulfonate, 1,2,4-butanetriol tribenzenesulfonate, 1,2,4-butanetriol tri-p-toluenesulfonate, 1,2,4-butanetriol tri-4-ethylbenzenesulfonate, 1,2,4-butanetriol tris-3,5-dimethylbenzenesulfonate, and 1,2,4-butanetriol tri-2-mesitylenesulfonate, 1,2,5-pentanetriol trisulfonates such as 1,2,5-pentanetriol trimethanesulfonate, 1,2,5-pentanetriol triethanesulfonate, 1,2,5-pentanetriol tripropanesulfonate, 1,2,5-pentanetriol tribenzenesulfonate, and 1,2,5-pentanetriol tri-p-toluenesulfonate, 1,2,6-hexanetriol trisulfonates such as 1,2,6-hexanetriol trimethanesulfonate, 1,2,6-hexanetriol triethanesulfonate, 1,2,6-hexanetriol tripropanesulfonate, 1,2,6-hexanetriol tribenzenesulfonate, and 1,2,6-hexanetriol tri-p-toluenesulfonate, 1,2,3-heptanetriol trisulfonates such as 1,2,3-heptanetriol trimethanesulfonate, 1,2,3-heptanetriol triethanesulfonate, 1,2,3-heptanetriol tripropanesulfonate, 1,2,3-heptanetriol tribenzenesulfonate, and 1,2,3-heptanetriol tri-p-toluenesulfonate, 1,2,7-heptanetriol trisulfonates such as 1,2,7-heptanetriol trimethanesulfonate, 1,2,7-heptanetriol triethanesulfonate, 1,2,7-heptanetriol tripropanesulfonate, 1,2,7-heptanetriol tribenzenesulfonate, and 1,2,7-heptanetriol tri-p-toluenesulfonate, 1,2,8-octanetriol trisulfonates such as 1,2,8-octanetriol trimethanesulfonate, 1,2,8-octanetriol triethanesulfonate, 1,2,8-octanetriol tripropanesulfonate, 1,2,8-octanetriol tribenzenesulfonate, and 1,2,8-octanetriol tri-p-toluenesulfonate, trimethylolethane trisulfonates such as trimethylolethane trimethanesulfonate, trimethylolethane triethanesulfonate, trimethylolethane tripropanesulfonate, trimethylolethane tributanesulfonate, trimethylolethane tribenzenesulfonate, trimethylolethane tri-p-toluenesulfonate, trimethylolethane tri-4-ethylbenzenesulfonate, trimethylolethane tris-3,5-dimethylbenzenesulfonate, and trimethylolethane tri-2-mesitylenesulfonate, trimethylolpropane trisulfonates such as trimethylolpropane trimethanesulfonate, trimethylolpropane triethanesulfonate, trimethylolpropane tripropanesulfonate, trimethylolpropane tributanesulfonate, trimethylolpropane tribenzenesulfonate, trimethylolpropane tri-p-toluenesulfonate, trimethylolpropane tri-4-ethylbenzenesulfonate, trimethylolpropane tris-3,5-dimethylbenzenesulfonate, and trimethylolpropane tri-2-mesitylenesulfonate, 3-methylpentane-1,3,5-triol trisulfonates such as 3-methylpentane-1,3,5-triol trimethanesulfonate, 3-methylpentane-1,3,5-triol triethanesulfonate, 3-methylpentane-1,3,5-triol tripropanesulfonate, 3-methylpentane-1,3,5-triol tributanesulfonate, 3-methylpentane-1,3,5-triol tribenzenesulfonate, 3-methylpentane-1,3,5-triol tri-p-toluenesulfonate, 3-methylpentane-1,3,5-triol tri-4-ethylbenzenesulfonate, 3-methylpentane-1,3,5-triol tris-3,5-dimethylbenzenesulfonate, and 3-methylpentane-1,3,5-triol tri-2-mesitylenesulfonate, 1,2,4-benzenetriol trisulfonates such as 1,2,4-benzenetriol trimethanesulfonate, 1,2,4-benzenetriol triethanesulfonate, 1,2,4-benzenetriol tripropanesulfonate, 1,2,4-benzenetriol tribenzenesulfonate, and 1,2,4-benzenetriol tri-p-toluenesulfonate, and the like; and tetravalent sulfonates, e.g., 1,2,3,4-butanetetraol tetrasulfonates such as 1,2,3,4-butanetetraol tetramethanesulfonate, 1,2,3,4-butanetetraol tetraethanesulfonate, 1,2,3,4-butanetetraol tetrapropanesulfonate, 1,2,3,4-butanetetraol tetrabenzenesulfonate, 1,2,3,4-butanetetraol tetra-p-toluenesulfonate, 1,2,3,4-butanetetraol tetra-4-ethylbenzenesulfonate, and 1,2,3,4-butanetetraol tetrakis-3,5-dimethylbenzenesulfonate; pentaerythritol tetrasulfonates such as pentaerythritol tetramethanesulfonate, pentaerythritol tetraethanesulfonate, pentaerythritol tetrapropanesulfonate, pentaerythritol tetrabenzenesulfonate, pentaerythritol tetra-p-toluenesulfonate, pentaerythritol tetra-4-ethylbenzenesulfonate, and pentaerythritol tetrakis-3,5-dimethylbenzenesulfonate, and the like.

Preferred are trivalent sulfonates, e.g., 1,2,3-propanetriol trisulfonates such as 1,2,3-propanetriol trimethanesulfonate, 1,2,3-propanetriol triethanesulfonate, 1,2,3-propanetriol tribenzenesulfonate, and 1,2,3-propanetriol tri-p-toluenesulfonate, 1,2,3-butanetriol trisulfonates such as 1,2,3-butanetriol trimethanesulfonate, 1,2,3-butanetriol triethanesulfonate, 1,2,3-butanetriol tribenzenesulfonate, and 1,2,3-butanetriol tri-p-toluenesulfonate, 1,2,4-butanetriol trisulfonates such as 1,2,4-butanetriol trimethanesulfonate, 1,2,4-butanetriol triethanesulfonate, 1,2,4-butanetriol tribenzenesulfonate, and 1,2,4-butanetriol tri-p-toluenesulfonate, trimethylolpropane trisulfonates such as trimethylolpropane trimethanesulfonate, trimethylolpropane triethanesulfonate, trimethylolpropane tribenzenesulfonate, and trimethylolpropane tri-p-toluenesulfonate, 3-methylpentane-1,3,5-triol trisulfonates such as 3-methylpentane-1,3,5-triol trimethanesulfonate, 3-methylpentane-1,3,5-triol triethanesulfonate, 3-methylpentane-1,3,5-triol tribenzenesulfonate, and 3-methylpentane-1,3,5-triol tri-p-toluenesulfonate, and the like; and tetravalent sulfonates, e.g., 1,2,3,4-butanetetraol tetrasulfonates such as 1,2,3,4-butanetetraol tetramethanesulfonate, 1,2,3,4-butanetetraol tetraethanesulfonate, 1,2,3,4-butanetetraol tetrabenzenesulfonate, 1,2,3,4-butanetetraol tetra-p-toluenesulfonate, pentaerythritol tetrasulfonates such as pentaerythritol tetramethanesulfonate, pentaerythritol tetraethanesulfonate, pentaerythritol tetrabenzenesulfonate, and pentaerythritol tetra-p-toluenesulfonate, and the like.

More preferred are trivalent methanesulfonates and p-toluenesulfonates, such as 1,2,3-propanetriol trimethanesulfonate, 1,2,3-propanetriol tri-p-toluenesulfonate, 1,2,3-butanetriol trimethanesulfonate, 1,2,3-butanetriol tribenzenesulfonate, 1,2,3-butanetriol tri-p-toluenesulfonate, 1,2,4-butanetriol trimethanesulfonate, 1,2,4-butanetriol tri-p-toluenesulfonate, trimethylolpropane trimethanesulfonate, trimethylolpropane tri-p-toluenesulfonate, 3-methylpentane-1,3,5-triol trimethanesulfonate, and 3-methylpentane-1,3,5-triol tri-p-toluenesulfonate.

In the above formula (2), $R^2$ represents a fluorinated aliphatic saturated hydrocarbon group. With regard to the degree of fluorine-substitution in the aliphatic saturated hydrocarbon group, substitution of a part of hydrogen atoms thereof with fluorine atom(s) may be sufficient but all the hydrogen atoms may be substituted with fluorine atoms.

Examples thereof include linear perfluoroalkyl groups such as a trifluoromethyl group, a pentafluoroethyl group, a heptafluoropropyl group, a perfluorobutyl group, a perfluoropentyl group, a perfluorohexyl group, a perfluoroheptyl group, a perfluorooctyl group, and a perfluorodecyl group, branched perfluoroalkyl groups such as a perfluoro-1-methylethyl group, a perfluoro-3-methylbutyl group, a perfluoro-5-methylhexyl group, and a perfluoro-7-methyloctyl group, partially fluorinated linear alkyl groups such as a fluoromethyl group, a difluoromethyl group, a 1,1,2,2-tetrafluoroethyl group, a 1,1,1,2-tetrafluoroethyl group, a 1,1,2,2,3,3,4,4-octafluorobutyl group, and a 1,1,2,2,3,3,4,4,5,5,6,6-dodecafluorohexyl group, partially fluorinated branched alkyl groups such as 1,1,1,2,3,3-hexafluoropropyl group and 1,1-bis(trifluoromethyl)ethyl group, and the like.

Moreover, the above $n^2$ represents an integer of 1 or more, and is preferably an integer of 1 to 6, more preferably 1 or 2.

Furthermore, the above $Z^2$ represents an integer of 2 or more, and is preferably an integer of 2 to 4. Additionally, $L^2$ represents a $Z^2$-valent connecting group composed of carbon atom(s) and hydrogen atoms. The number of the carbon atoms constituting the connecting group $L^2$ is preferably 3 to 12, more preferably 3 to 8.

When the above $Z^2$ is 2, $L^2$ represents a divalent connecting group composed of carbon atoms and hydrogen atoms. The following will exemplify the group.

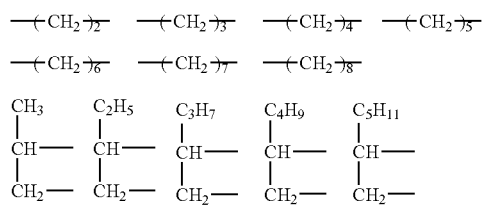

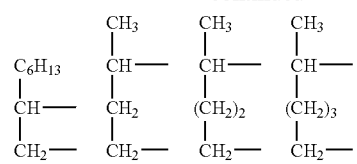

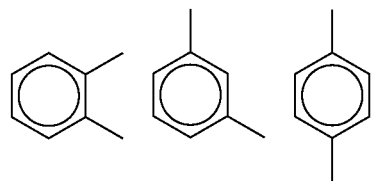

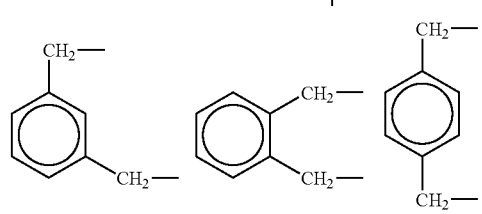

Moreover, when $Z^2$ is 3, $L^2$ represents a trivalent connecting group composed of carbon atoms and hydrogen atoms. The following will exemplify the group.

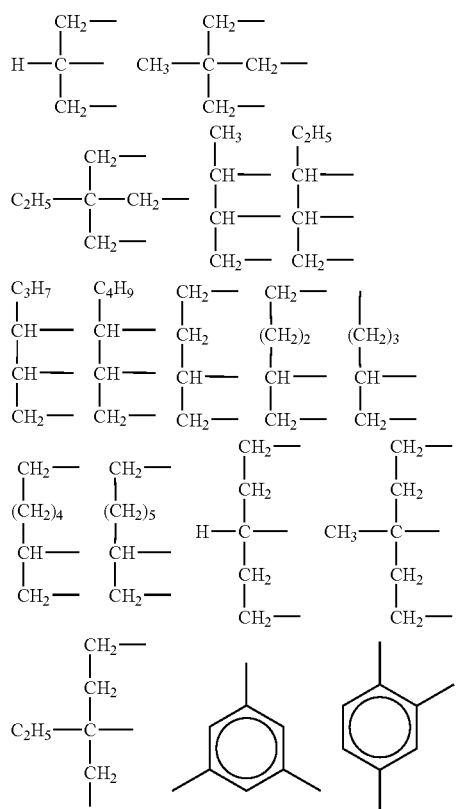

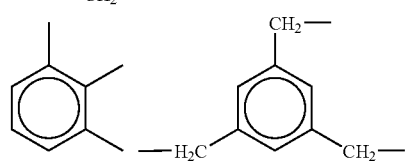

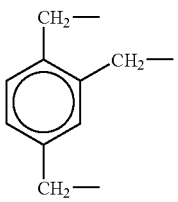

Furthermore, when the above $Z^2$ is 4, $L^2$ represents a tetravalent connecting group composed of carbon atoms and hydrogen atoms. The following will exemplify the group.

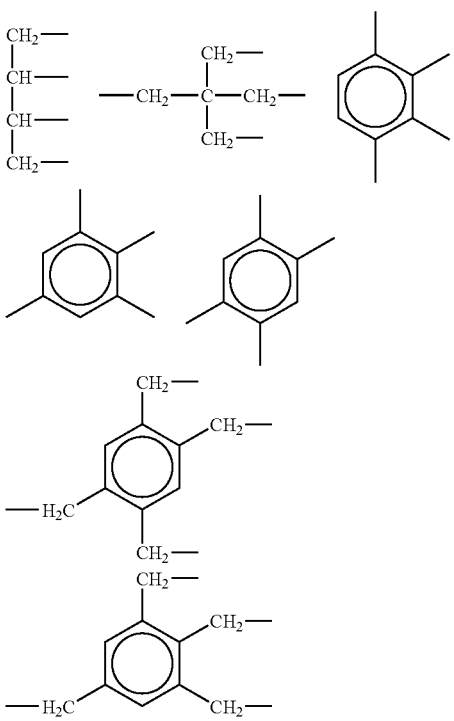

Examples of the fluorine-containing sulfonate compound represented by the formula (2) include divalent sulfonates, e.g., ethanediol disulfonates such as ethanediol bis(2,2,2-trifluoroethanesulfonate), ethanediol bis(2,2,3,3,3-pentafluoropropanesulfonate), ethanediol bis(2,2,3,3,4,4,4-heptafluorobutanesulfonate), ethanediol bis(2,2,3,3-tetrafluoropropanesulfonate), ethanediol bis(2,2,3,3,4,4-hexafluorobutanesulfonate), ethanediol bis(2,2,3,3,4,4,5,5-octafluoropentanesulfonate), ethanediol bis(2,2,3,3,4,4,5,5,6,6,7,7-dodecafluoroheptanesulfonate), ethanediol bis(2,2,3,3,4,4,5,5,6,6,7,7,8,8,9,9-hexadecafluoroheptanesulfonate), ethanediol bis(2,2,3,4,4,4-hexafluorobutanesulfonate), ethanediol bis(3,3,4,4,4-pentafluorobutanesulfonate), ethanediol bis(3,3,4,4,5,5,6,6,6-nonafluorohexanesulfonate), ethanediol bis(3,3,4,4,5,5,6,6,7,7,8,8,8-tridecafluorooctanesulfonate), ethanediol bis(3,3,4,4,5,5,6,6,7,7,8,8,9,9,10,10,10-heptadecafluorodecanesulfonate), ethanediol bis{2-(perfluoro-3-methylbutyl)ethanesulfonate}, ethanediol bis{2-(perfluoro-5-methylhexyl)ethanesulfonate}, ethanediol bis{2-(perfluoro-5-methyloctyl)ethanesulfonate}, ethanediol bis{2-(perfluoro-5-methyloctyl)ethanesulfonate}, ethanediol bis(4,4,5,5,6,6,7,7,7-nonafluoroheptanesulfonate), and ethanediol bis(7,7,8,8,9,9,10,10,10-nonafluorodecanesulfonate), 1,2-propanediol disulfonates such as 1,2-propanediol bis(2,2,2-trifluoroethanesulfonate), 1,2-propanediol bis(2,2,3,3,3-pentafluoropropanesulfonate), 1,2-propanediol bis(2,2,3,3,4,4,4-heptafluorobutanesulfonate), 1,2-propanediol bis(2,2,3,3-tetrafluoropropanesulfonate), 1,2-propanediol bis(2,2,3,3,4,4-hexafluorobutanesulfonate), 1,2-propanediol bis(2,2,3,3,4,4,5,5-octafluoropentanesulfonate), 1,2-propanediol bis(2,2,3,3,4,4,5,5,6,6,7,7-dodecafluoroheptanesulfonate), 1,2-propanediol bis(2,2,3,3,4,4,5,5,6,6,7,7,8,8,9,9-hexadecafluoroheptanesulfonate), 1,2-propanediol bis(2,2,3,4,4,4-hexafluorobutanesulfonate), 1,2-propanediol bis(3,3,4,4,4-pentafluorobutanesulfonate), 1,2-propanediol bis(3,3,4,4,5,5,6,6,6-nonafluorohexanesulfonate), 1,2-propanediol bis(3,3,4,4,5,5,6,6,7,7,8,8,8-tridecafluorooctanesulfonate), 1,2-propanediol bis(3,3,4,4,5,5,6,6,7,7,8,8,9,9,10,10,10-heptadecafluorodecanesulfonate), 1,2-propanediol bis{2-(perfluoro-3-methylbutyl)ethanesulfonate}, 1,2-propanediol bis{2-(perfluoro-5-methylhexyl)ethanesulfonate}, 1,2-propanediol bis{2-(perfluoro-5-methyloctyl)ethanesulfonate}, 1,2-propanediol bis{2-(perfluoro-5-methyloctyl)ethanesulfonate}, 1,2-propanediol bis(4,4,5,5,6,6,7,7,7-nonafluoroheptanesulfonate), and 1,2-propanediol bis(7,7,8,8,9,9,10,10,10-nonafluorodecanesulfonate), 1,3-propanediol disulfonate such as 1,3-propanediol bis(2,2,2-trifluoroethanesulfonate), 1,3-propanediol bis(2,2,3,3,3-pentafluoropropanesulfonate), 1,3-propanediol bis(2,2,3,3,4,4,4-heptafluorobutanesulfonate), 1,3-propanediol bis(2,2,3,3-tetrafluoropropanesulfonate), 1,3-propanediol bis(2,2,3,3,4,4-hexafluorobutanesulfonate), 1,3-propanediol bis(2,2,3,3,4,4,5,5-octafluoropentanesulfonate), 1,3-propanediol bis(2,2,3,3,4,4,5,5,6,6,7,7-dodecafluoroheptanesulfonate), 1,3-propanediol bis(2,2,3,3,4,4,5,5,6,6,7,7,8,8,9,9-hexadecafluoroheptanesulfonate), 1,3-propanediol bis(2,2,3,4,4,4-hexafluorobutanesulfonate), 1,3-propanediol bis(3,3,4,4,4-pentafluorobutanesulfonate), 1,3-propanediol bis(3,3,4,4,5,5,6,6,6-nonafluorohexanesulfonate), 1,3-propanediol bis(3,3,4,4,5,5,6,6,7,7,8,8,8-tridecafluorooctanesulfonate), 1,3-propanediol bis(3,3,4,4,5,5,6,6,7,7,8,8,9,9,10,10,10-heptadecafluorodecanesulfonate), 1,3-propanediol bis{2-(perfluoro-3-methylbutyl)ethanesulfonate}, 1,3-propanediol bis{2-(perfluoro-5-methylhexyl)ethanesulfonate}, 1,3-propanediol bis{2-(perfluoro-5-methyloctyl)ethanesulfonate}, 1,3-propanediol bis{2-(perfluoro-5-methyloctyl)ethanesulfonate}, 1,3-propanediol bis(4,4,5,5,6,6,7,7,7-nonafluoroheptanesulfonate), and 1,3-propanediol bis(7,7,8,8,9,9,10,10,10-nonafluorodecanesulfonate), 1,2-butanediol disulfonate such as 1,2-butanediol bis(2,2,2-trifluoroethanesulfonate), 1,2-butanediol bis(2,2,3,3,3-pentafluoropropanesulfonate), 1,2-butanediol bis(2,2,3,3,4,4,4-heptafluorobutanesulfonate), 1,2-butanediol bis(3,3,4,4,5,5,6,6,6-nonafluorohexanesulfonate), and 1,2-butanediol bis(3,3,4,4,5,5,6,6,7,7,8,8,9,9,10,10,10-heptadecafluorodecanesulfonate), 1,3-butanediol disulfonate such as 1,3-butanediol bis(2,2,2-trifluoroethanesulfonate), 1,3-butanediol bis(2,2,3,3,3-pentafluoropropanesulfonate), 1,3-butanediol bis(2,2,3,3,4,4,4-heptafluorobutanesulfonate), 1,3-butanediol bis(3,3,4,4,5,5,6,6,6-nonafluorohexanesulfonate), and 1,3-butanediol bis(3,3,4,4,5,5,6,6,7,7,8,8,9,9,10,10,10-heptadecafluorodecanesulfonate), 1,4-butanediol disulfonate such as 1,4-butanediol bis(2,2,2-trifluoroethanesulfonate), 1,4-butanediol bis(2,2,3,3,3-pentafluoropropanesulfonate), 1,4-butanediol bis(2,2,3,3,4,4,4-heptafluorobutanesulfonate), 1,4-butanediol bis(2,2,3,3-tetrafluoropropanesulfonate), 1,4-butanediol bis(2,2,3,3,4,4-hexafluorobutanesulfonate), 1,4-butanediol bis(2,2,3,3,4,4,5,5-octafluoropentanesulfonate), 1,4-butanediol bis(2,2,3,3,4, 4,5,5,6,6,7,7-dodecafluoroheptanesulfonate), 1,4-butanediol bis(2,2,3,3,4,4,5,5,6,6,7,7,8,8,9,9-hexadecafluoroheptanesulfonate), 1,4-butanediol bis(2,2,3,4,4,4-hexafluorobutanesulfonate), 1,4-butanediol bis(3,3,4,4,4-pentafluorobutanesulfonate), 1,4-butanediol bis(3,3,4,4,5,5,6,6,6-nonafluorohexanesulfonate), 1,4-butanediol bis(3,3,4,4,5,5,6,6,7,7,8,8,8-tridecafluorooctanesulfonate), 1,4-butanediol bis(3,3,4,4,5,5,6,6,7,7,8,8,9,9,10,10,10-heptadecafluorodecanesulfonate), 1,4-butanediol bis{2-(perfluoro-3-methylbutyl)ethanesulfonate}, 1,4-butanediol bis{2-(perfluoro-5-methylhexyl)ethanesulfonate}, 1,4-butanediol bis{2-(perfluoro-5-methyloctyl)ethanesulfonate}, 1,4-butanediol bis{2-(perfluoro-5-methyloctyl)ethanesulfonate}, 1,4-butanediol bis(4,4,5,5,6,6,7,7,7-nonafluoroheptanesulfonate), and 1,4-butanediol bis(7,7,8,8,9,9,10,10,10-nonafluorodecanesulfonate), 1,4-benzenediol disulfonate such as 1,4-benzenediol bis(2,2,2-trifluoroethanesulfonate), 1,4-benzenediol bis(2,2,3,3,3-pentafluoropropanesulfonate), 1,4-benzenediol bis(2,2,3,3,4,4,4-heptafluorobutanesulfonate), 1,4-benzenediol bis(3,3,4,4,5,5,6,6,6-nonafluorohexanesulfonate), and 1,4-benzenediol bis(3,3,4,4,5,5,6,6,7,7,8,8,9,9,10,10,10-heptadecafluorodecanesulfonate), and the like; trivalent sulfonates, e.g., 1,2,3-propanetriol trisulfonate such as 1,2,3-propanetriol tris(2,2,2-trifluoroethanesulfonate), 1,2,3-propanetriol tris(2,2,3,3,3-pentafluoropropanesulfonate), 1,2,3-propanetriol tris(2,2,3,3,4,4,4-heptafluorobutanesulfonate), 1,2,3-propanetriol tris(3,3,4,4,5,5,6,6,6-nonafluorohexanesulfonate), and 1,2,3-propanetriol tris(3,3,4,4,5,5,6,6,7,7,8,8,9,9,10,10,10-heptadecafluorodecanesulfonate), 1,2,3-butanetriol trisulfonate such as 1,2,3-butanetriol tris(2,2,2-trifluoroethanesulfonate), 1,2,3-butanetriol tris(2,2,3,3,3-pentafluoropropanesulfonate), 1,2,3-butanetriol tris(2,2,3,3,4,4,4-heptafluorobutanesulfonate), 1,2,3-butanetriol tris(3,3,4,4,5,5,6,6,6-nonafluorohexanesulfonate), and 1,2,3-butanetriol tris(3,3,4,4,5,5,6,6,7,7,8,8,9,9,10,10,10-heptadecafluorodecanesulfonate), 1,2,4-butanetriol trisulfonate such as 1,2,4-butanetriol tris(2,2,2-trifluoroethanesulfonate), 1,2,4-butanetriol tris(2,2,3,3,3-pentafluoropropanesulfonate), 1,2,4-butanetriol tris(2,2,3,3,4,4,4-heptafluorobutanesulfonate), 1,2,4-butanetriol tris(3,3,4,4,5,5,6,6,6-nonafluorohexanesulfonate), and 1,2,4-butanetriol tris(3,3,4,4,5,5,6,6,7,7,8,8,9,9,10,10,10-heptadecafluorodecanesulfonate), trimethylolethane trisulfonate such as trimethylolethane tris(2,2,2-trifluoroethanesulfonate), trimethylolethane tris(2,2,3,3,3-pentafluoropropanesulfonate), trimethylolethane tris(2,2,3,3,4,4,4-heptafluorobutanesulfonate), trimethylolethane tris(3,3,4,4,5,5,6,6,6-nonafluorohexanesulfonate), and trimethylolethane tris(3,3,4,4,5,5,6,6,7,7,8,8,9,9,10,10,10-heptadecafluorodecanesulfonate), trimethylolpropane trisulfonate such as trimethylolpropane tris(2,2,2-trifluoroethanesulfonate), trimethylolpropane tris(2,2,3,3,3-pentafluoropropanesulfonate), trimethylolpropane tris(2,2,3,3,4,4,4-heptafluorobutanesulfonate), trimethylolpropane tris(3,3,4,4,5,5,6,6,6-nonafluorohexanesulfonate), and trimethylolpropane tris(3,3,4,4,5,5,6,6,7,7,8,8,9,9,10,10,10-heptadecafluorodecanesulfonate), 3-methylpentane-1,3,5-triol trisulfonate such as 3-methylpentane-1,3,5-triol tris(2,2,2-trifluoroethanesulfonate), 3-methylpentane-1,3,5-triol tris(2,2,3,3,3-pentafluoropropanesulfonate), 3-methylpentane-1,3,5-triol tris(2,2,3,3,4,4,4-heptafluorobutanesulfonate), 3-methylpentane-1,3,5-triol tris(3,3,4,4,5,5,6,6,6-nonafluorohexanesulfonate), and 3-methylpentane-1,3,5-triol tris(3,3,4,4,5,5,6,6,7,7,8,8,9,9,10,10,10-heptadecafluorodecanesulfonate), 1,2,4-benzenetriol trisulfonate such as 1,2,4-benzenetriol tris(2,2,2-trifluoroethanesulfonate), 1,2,4-benzenetriol tris(2,2,3,3,3-pentafluoropropanesulfonate), 1,2,4-benzenetriol tris(2,2,3,3,4,4,4-heptafluorobutanesulfonate), 1,2,4-benzenetriol tris(3,3,4,4,5,5,6,6,6-nonafluorohexanesulfonate), and 1,2,4-benzenetriol tris(3,3,4,4,5,5,6,6,7,7,8,8,9,9,10,10,10-heptadecafluorodecanesulfonate), and the like; and tetravalent sulfonates, e.g., 1,2,3,4-butanetetraol tetrasulfonate such as 1,2,3,4-butanetetraol tetrakis(2,2,2-trifluoroethanesulfonate), 1,2,3,4-butanetetraol tetrakis(2,2,3,3,3-pentafluoropropanesulfonate), 1,2,3,4-butanetetraol tetrakis(2,2,3,3,4,4,4-heptafluorobutanesulfonate), 1,2,3,4-butanetetraol tetrakis(3,3,4,4,5,5,6,6,6-nonafluorohexanesulfonate), and 1,2,3,4-butanetetraol tetrakis(3,3,4,4,5,5,6,6,7,7,8,8,9,9,10,10,10-heptadecafluorodecanesulfonate), pentaerythritol tetrasulfonate such as pentaerythritol tetrakis(2,2,2-trifluoroethanesulfonate), pentaerythritol tetrakis(2,2,3,3,3-pentafluoropropanesulfonate), pentaerythritol tetrakis(2,2,3,3,4,4,4-heptafluorobutanesulfonate), pentaerythritol tetrakis(3,3,4,4,5,5,6,6,6-nonafluorohexanesulfonate), and pentaerythritol tetrakis(3,3,4,4,5,5,6,6,7,7,8,8,9,9,10,10,10-heptadecafluorodecanesulfonate), and the like.

Preferred are divalent perfluoroalkylmethanesulfonates such as ethanediol bis(2,2,2-trifluoroethanesulfonate), ethanediol bis(2,2,3,3,3-pentafluoropropanesulfonate), ethanediol bis(2,2,3,3,4,4,4-heptafluorobutanesulfonate), 1,2-propanediol bis(2,2,2-trifluoroethanesulfonate), 1,2-propanediol bis(2,2,3,3,3-pentafluoropropanesulfonate), 1,2-propanediol bis(2,2,3,3,4,4,4-heptafluorobutanesulfonate), 1,3-propanediol bis(2,2,2-trifluoroethanesulfonate), 1,3-propanediol bis(2,2,3,3,3-pentafluoropropanesulfonate), 1,3-propanediol bis(2,2,3,3,4,4,4-heptafluorobutanesulfonate), 1,2-butanediol bis(2,2,2-trifluoroethanesulfonate), 1,2-butanediol bis(2,2,3,3,3-pentafluoropropanesulfonate), 1,2-butanediol bis(2,2,3,3,4,4,4-heptafluorobutanesulfonate), 1,3-butanediol bis(2,2,2-trifluoroethanesulfonate), 1,3-butanediol bis(2,2,3,3,3-pentafluoropropanesulfonate), 1,3-butanediol bis(2,2,3,3,4,4,4-heptafluorobutanesulfonate), 1,4-butanediol bis(2,2,2-trifluoroethanesulfonate), 1,4-butanediol bis(2,2,3,3,3-pentafluoropropanesulfonate), 1,4-butanediol bis(2,2,3,3,4,4,4-heptafluorobutanesulfonate), and the like; trivalent perfluoroalkylmethanesulfonates such as 1,2,3-propanetriol tris(2,2,2-trifluoroethanesulfonate), 1,2,3-propanetriol tris(2,2,3,3,3-pentafluoropropanesulfonate), 1,2,3-butanetriol tris(2,2,2-trifluoroethanesulfonate), 1,2,3-butanetriol tris(2,2,3,3,3-pentafluoropropanesulfonate), 1,2,4-butanetriol tris(2,2,2-trifluoroethanesulfonate), 1,2,4-butanetriol tris(2,2,3,3,3-pentafluoropropanesulfonate), trimethylolethane tris(2,2,2-trifluoroethanesulfonate), trimethylolethane tris(2,2,3,3,3-pentafluoropropanesulfonate), trimethylolpropane tris(2,2,2-trifluoroethanesulfonate), trimethylolpropane tris(2,2,3,3,3-pentafluoropropanesulfonate), 3-methylpentane-1,3,5-triol tris(2,2,2-trifluoroethanesulfonate), 3-methylpentane-1,3,5-triol tris(2,2,3,3,3-pentafluoropropanesulfonate), and the like; and tetravalent perfluoroalkylmethanesulfonates such as 1,2,3,4-butanetetraol tetrakis(2,2,2-trifluoroethanesulfonate), 1,2,3,4-butanetetraol tetrakis(2,2,3,3,3-pentafluoropropanesulfonate), pentaerythritol tetrakis(2,2,2-trifluoroethanesulfonate), pentaerythritol tetrakis(2,2,3,3,3-pentafluoropropanesulfonate), and the like.

In the above formula (3), each of $R^3$ to $R^5$ independently represents a hydrogen atom or a hydrocarbon group having 1 to 8 carbon atoms. Examples of the hydrocarbon group include alkyl groups having 1 to 8 carbon atoms, such as a methyl group, an ethyl group, a propyl group, an isopropyl group, and a butyl group; alkenyl groups having 2 to 8 carbon atoms, such as a vinyl group, an isopropenyl group, and an allyl group; aryl groups having 6 to 8 carbon atoms, such as a phenyl group, a tolyl group, an ethylphenyl group, and a dimethylphenyl group; aralkyl groups having 7 to 8 carbon atoms, such as a benzyl group and a phenethyl group. Of these, preferred are alkyl groups having 1 to 4 carbon atoms and alkenyl groups having 2 to 4 carbon atoms, and more preferred are alkyl groups having 1 to 4 carbon atoms.

$R^6$ and $R^7$ each independently represents a hydrogen atom or a hydrocarbon group having 1 to 8 carbon atoms. Examples of the hydrocarbon group include alkyl groups having 1 to 8 carbon atoms, such as a methyl group, an ethyl group, a propyl group, an isopropyl group, and a butyl group; alkenyl groups having 2 to 8 carbon atoms, such as a vinyl group, an isopropenyl group, and an allyl group; aryl groups having 6 to 8 carbon atoms, such as a phenyl group, a tolyl group, an ethylphenyl group, and a dimethylphenyl group; aralkyl groups having 7 to 8 carbon atoms, such as a benzyl group and a phenethyl group. Of these, preferred is a hydrogen atom, an alkyl group having 1 to 3 carbon atoms, an alkenyl group having 2 to 4 carbon atoms, a phenyl group, a tolyl group, a benzyl group, or a phenethyl group, and more preferred is a hydrogen atom or a methyl group.

$R^8$ represents a hydrocarbon group having 1 to 8 carbon atoms. Examples of the hydrocarbon group include alkyl groups having 1 to 8 carbon atoms, such as a methyl group, an ethyl group, a propyl group, an isopropyl group, and a butyl group; alkenyl groups having 2 to 8 carbon atoms, such as a vinyl group, an isopropenyl group, and an allyl group; aryl groups having 6 to 8 carbon atoms, such as a phenyl group, a tolyl group, an ethylphenyl group, and a dimethylphenyl group; aralkyl groups having 7 to 8 carbon atoms, such as a benzyl group and a phenethyl group. Of these, preferred is an alkyl group having 1 to 4 carbon atoms, an alkenyl group having 2 to 4 carbon atoms, a phenyl group or a tolyl group, and more preferred is a methyl group, an ethyl group, a phenyl group, or a tolyl group.

$n^3$ represents an integer of 0 to 4, preferably an integer of 0 to 2, more preferably 0.

Specific examples of the compound represented by the formula (3) include the following.

(i) Silyl(alkyl)methanesulfonates: There are mentioned trimethylsilyl methanesulfonate, triethylsilyl methanesulfonate, tripropylsilyl methanesulfonate, triisopropylsilyl methanesulfonate, tributylsilyl methanesulfonate, triisobutylsilyl methanesulfonate, tri-t-butylsilyl methanesulfonate, trihexylsilyl methanesulfonate, triphenylsilyl methanesulfonate, tribenzylsilyl methanesulfonate, ethyldimethylsilyl methanesulfonate, dimethylpropylsilyl methanesulfonate, dimethylisopropylsilyl methanesulfonate, butyldimethylsilyl methanesulfonate, t-butyldimethylsilyl methanesulfonate, dimethyloctylsilyl methanesulfonate, diethylisopropylsilyl methanesulfonate, octyldiisopropylsilyl methanesulfonate, dimethylphenylsilyl methanesulfonate, dimethylphenethylsilyl methanesulfonate, benzyldimethylsilyl methanesulfonate, vinyldimethylsilyl methanesulfonate, allyldimethylsilyl methanesulfonate, trimethylsilylmethyl methanesulfonate, 1-(trimethylsilyl)ethyl methanesulfonate, 2-(trimethylsilyl)ethyl methanesulfonate, 3-(trimethylsilyl)propyl methanesulfonate, and the like.

Of these, preferred are trialkylsilyl methanesulfonates wherein all of $R^3$ to $R^5$ are alkyl groups having 1 to 4 carbon atoms and $n^3$ is 0, such as trimethylsilyl methanesulfonate, triethylsilyl methanesulfonate, tripropylsilyl methanesulfonate, triisopropylsilyl methanesulfonate, tributylsilyl methanesulfonate, triisobutylsilyl methanesulfonate, tri-t-butylsilyl methanesulfonate, ethyldimethylsilyl methanesulfonate, dimethylpropylsilyl methanesulfonate, dimethylisopropylsilyl methanesulfonate, butyldimethylsilyl methanesulfonate, t-butyldimethylsilyl methanesulfonate, and diethylisopropylsilyl methanesulfonate.

(ii) Silyl(alkyl)ethanesulfonates: There are mentioned trimethylsilyl ethanesulfonate, triethylsilyl ethanesulfonate, tripropylsilyl ethanesulfonate, triisopropylsilyl ethanesulfonate, tributylsilyl ethanesulfonate, triisobutylsilyl ethanesulfonate, tri-t-butylsilyl ethanesulfonate, trihexylsilyl ethanesulfonate, triphenylsilyl ethanesulfonate, tribenzylsilyl ethanesulfonate, ethyldimethylsilyl ethanesulfonate, dimethylpropylsilyl ethanesulfonate, dimethylisopropylsilyl ethanesulfonate, butyldimethylsilyl ethanesulfonate, t-butyldimethylsilyl ethanesulfonate, dimethyloctylsilyl ethanesulfonate, diethylisopropylsilyl ethanesulfonate, octyldiisopropylsilyl ethanesulfonate, dimethylphenylsilyl ethanesulfonate, dimethylphenethylsilyl ethanesulfonate, benzyldimethylsilyl ethanesulfonate, vinyldimethylsilyl ethanesulfonate, allyldimethylsilyl ethanesulfonate, trimethylsilylmethyl ethanesulfonate, 1-(trimethylsilyl)ethyl ethanesulfonate, 2-(trimethylsilyl)ethyl ethanesulfonate, 3-(trimethylsilyl)propyl ethanesulfonate, and the like.

Of these, preferred are trialkylsilyl ethanesulfonates wherein all of $R^3$ to $R^5$ are alkyl groups having 1 to 4 carbon atoms and $n^3$ is 0, such as trimethylsilyl ethanesulfonate, triethylsilyl ethanesulfonate, tripropylsilyl ethanesulfonate, triisopropylsilyl ethanesulfonate, tributylsilyl ethanesulfonate, triisobutylsilyl ethanesulfonate, tri-t-butylsilyl ethanesulfonate, ethyldimethylsilyl ethanesulfonate, dimethylpropylsilyl ethanesulfonate, dimethylisopropylsilyl ethanesulfonate, butyldimethylsilyl ethanesulfonate, t-butyldimethylsilyl ethanesulfonate, and diethylisopropylsilyl ethanesulfonate.

(iii) Silyl(alkyl) propanesulfonates: There are mentioned trimethylsilyl propanesulfonate, triethylsilyl propanesulfonate, tripropylsilyl propanesulfonate, triisopropylsilyl propanesulfonate, tributylsilyl propanesulfonate, triisobutylsilyl propanesulfonate, tri-t-butylsilyl propanesulfonate, trihexylsilyl propanesulfonate, triphenylsilyl propanesulfonate, tribenzylsilyl propanesulfonate, ethyldimethylsilyl propanesulfonate, dimethylpropylsilyl propanesulfonate, dimethylisopropylsilyl propanesulfonate, butyldimethylsilyl propanesulfonate, t-butyldimethylsilyl propanesulfonate, dimethyloctylsilyl propanesulfonate, diethylisopropylsilyl propanesulfonate, octyldiisopropylsilyl propanesulfonate, dimethylphenylsilyl propanesulfonate, dimethylphenethylsilyl propanesulfonate, benzyldimethylsilyl propanesulfonate, vinyldimethylsilyl propanesulfonate, allyldimethylsilyl propanesulfonate, trimethylsilylmethyl propanesulfonate, 1-(trimethylsilyl)ethyl propanesulfonate, 2-(trimethylsilyl)ethyl propanesulfonate, 3-(trimethylsilyl)propyl propanesulfonate, and the like.

(iv) Silyl(alkyl) butanesulfonates: There are mentioned trimethylsilyl butanesulfonate, triethylsilyl butanesulfonate, tripropylsilyl butanesulfonate, triisopropylsilyl butanesulfonate, tributylsilyl butanesulfonate, triisobutylsilyl butanesulfonate, tri-t-butylsilyl butanesulfonate, trihexylsilyl butanesulfonate, triphenylsilyl butanesulfonate, tribenzylsilyl butanesulfonate, ethyldimethylsilyl butanesulfonate, dimethylpropylsilyl butanesulfonate, dimethylisopropylsilyl butanesulfonate, butyldimethylsilyl butanesulfonate, t-butyldimethylsilyl butanesulfonate, dimethyloctylsilyl butanesulfonate, diethylisopropylsilyl butanesulfonate, octyldiisopropylsilyl butanesulfonate, dimethylphenylsilyl butanesulfonate, dimethylphenethylsilyl butanesulfonate, benzyldimethylsilyl butanesulfonate, vinyldimethylsilyl butanesulfonate, allyldimethylsilyl butanesulfonate, trimethylsilylmethyl butanesulfonate, 1-(trimethylsilyl)ethyl butanesulfonate, 2-(trimethylsilyl)ethyl butanesulfonate, 3-(trimethylsilyl)propyl butanesulfonate, and the like.

(v) Silyl(alkyl)benzenesulfonates: There are mentioned trimethylsilyl benzenesulfonate, triethylsilyl benzenesulfonate, tripropylsilyl benzenesulfonate, triisopropylsilyl benzenesulfonate, tributylsilyl benzenesulfonate, triisobutylsilyl benzenesulfonate, tri-t-butylsilyl benzenesulfonate, trihexylsilyl benzenesulfonate, triphenylsilyl benzenesulfonate, tribenzylsilyl benzenesulfonate, ethyldimethylsilyl benzenesulfonate, dimethylpropylsilyl benzenesulfonate, dimethylisopropylsilyl benzenesulfonate, butyldimethylsilyl benzenesulfonate, t-butyldimethylsilyl benzenesulfonate, dimethyloctylsilyl benzenesulfonate, diethylisopropylsilyl benzenesulfonate, octyldiisopropylsilyl benzenesulfonate, dimethylphenylsilyl benzenesulfonate, dimethylphenethylsilyl benzenesulfonate, benzyldimethylsilyl benzenesulfonate, vinyldimethylsilyl benzenesulfonate, allyldimethylsilyl benzenesulfonate, trimethylsilylmethyl benzenesulfonate, 1-(trimethylsilyl)ethyl benzenesulfonate, 2-(trimethylsilyl)ethyl benzenesulfonate, 3-(trimethylsilyl)propyl benzenesulfonate, and the like.

Of these, preferred are trialkylsilyl benzenesulfonates wherein all of $R^3$ to $R^5$ are alkyl groups having 1 to 4 carbon atoms and $n^3$ is 0, such as trimethylsilyl benzenesulfonate, triethylsilyl benzenesulfonate, tripropylsilyl benzenesulfonate, triisopropylsilyl benzenesulfonate, tributylsilyl benzenesulfonate, triisobutylsilyl benzenesulfonate, tri-t-butylsilyl benzenesulfonate, ethyldimethylsilyl benzenesulfonate, dimethylpropylsilyl benzenesulfonate, dimethylisopropylsilyl benzenesulfonate, butyldimethylsilyl benzenesulfonate, t-butyldimethylsilyl benzenesulfonate, and diethylisopropylsilyl benzenesulfonate.

(vi) Silyl(alkyl)-p-toluenesulfonates: There are mentioned trimethylsilyl-p-toluenesulfonate, triethylsilyl-p-toluenesulfonate, tripropylsilyl-p-toluenesulfonate, triisopropylsilyl-p-toluenesulfonate, tributylsilyl-p-toluenesulfonate, triisobutylsilyl-p-toluenesulfonate, tri-t-butylsilyl-p-toluenesulfonate, trihexylsilyl-p-toluenesulfonate, triphenylsilyl-p-toluenesulfonate, tribenzylsilyl-p-toluenesulfonate, ethyldimethylsilyl-p-toluenesulfonate, dimethylpropylsilyl-p-toluenesulfonate, dimethylisopropylsilyl-p-toluenesulfonate, butyldimethylsilyl-p-toluenesulfonate, t-butyldimethylsilyl-p-toluenesulfonate, dimethyloctylsilyl-p-toluenesulfonate, diethylisopropylsilyl-p-toluenesulfonate, octyldiisopropylsilyl-p-toluenesulfonate, dimethylphenylsilyl-p-toluenesulfonate, dimethylphenethylsilyl-p-toluenesulfonate, benzyldimethylsilyl-p-toluenesulfonate, vinyldimethylsilyl-p-toluenesulfonate, allyldimethylsilyl-p-toluenesulfonate, trimethylsilylmethyl-p-toluenesulfonate, 1-(trimethylsilyl)ethyl-p-toluenesulfonate, 2-(trimethylsilyl)ethyl-p-toluenesulfonate, 3-(trimethylsilyl)propyl-p-toluenesulfonate, and the like.

Of these, preferred are trialkylsilyl-p-toluenesulfonates wherein $R^3$ to $R^5$ are alkyl groups having 1 to 4 carbon atoms and $n^3$ is 0, such as trimethylsilyl-p-toluenesulfonate, triethylsilyl-p-toluenesulfonate, tripropylsilyl-p-toluenesulfonate, triisopropylsilyl-p-toluenesulfonate, tributylsilyl-p-toluenesulfonate, triisobutylsilyl-p-toluenesulfonate, tri-t-butylsilyl-p-toluenesulfonate, ethyldimethylsilyl-p-toluenesulfonate, dimethylpropylsilyl-p-toluenesulfonate, dimethylisopropylsilyl-p-toluenesulfonate, butyldimethylsilyl-p-toluenesulfonate, t-butyldimethylsilyl-p-toluenesulfonate, and diethylisopropylsilyl-p-toluenesulfonate.

(vii) Silyl(alkyl)-4-ethylbenzenesulfonates: There are mentioned trimethylsilyl-4-ethylbenzenesulfonate, triethylsilyl-4-ethylbenzenesulfonate, tripropylsilyl-4-ethylbenzenesulfonate, triisopropylsilyl-4-ethylbenzenesulfonate, tributylsilyl-4-ethylbenzenesulfonate, triisobutylsilyl-4-ethylbenzenesulfonate, tri-t-butylsilyl-4-ethylbenzenesulfonate, trihexylsilyl-4-ethylbenzenesulfonate, triphenylsilyl-4-ethylbenzenesulfonate, tribenzylsilyl-4-ethylbenzenesulfonate, ethyldimethylsilyl-4-ethylbenzenesulfonate, dimethylpropylsilyl-4-ethylbenzenesulfonate, dimethylisopropylsilyl-4-ethylbenzenesulfonate, butyldimethylsilyl-4-ethylbenzenesulfonate, t-butyldimethylsilyl-4-ethylbenzenesulfonate, dimethyloctylsilyl-4-ethylbenzenesulfonate, diethylisopropylsilyl-4-ethylbenzenesulfonate, octyldiisopropylsilyl-4-ethylbenzenesulfonate, dimethylphenylsilyl-4-ethylbenzenesulfonate, dimethylphenethylsilyl-4-ethylbenzenesulfonate, benzyldimethylsilyl-4-ethylbenzenesulfonate, vinyldimethylsilyl-4-ethylbenzenesulfonate, allyldimethylsilyl-4-ethylbenzenesulfonate, trimethylsilylmethyl-4-ethylbenzenesulfonate, 1-(trimethylsilyl)ethyl-4-ethylbenzenesulfonate, 2-(trimethylsilyl)ethyl-4-ethylbenzenesulfonate, 3-(trimethylsilyl)propyl-4-ethylbenzenesulfonate, and the like.

(viii) Silyl-3,5-dimethylbenzenesulfonates: There are mentioned trimethylsilyl-3,5-dimethylbenzenesulfonate, triethylsilyl-3,5-dimethylbenzenesulfonate, tripropylsilyl-3,5-dimethylbenzenesulfonate, triisopropylsilyl-3,5-dimethylbenzenesulfonate, tributylsilyl-3,5-dimethylbenzenesulfonate, triisobutylsilyl-3,5-dimethylbenzenesulfonate, tri-t-butylsilyl-3,5-dimethylbenzenesulfonate, trihexylsilyl-3,5-dimethylbenzenesulfonate, triphenylsilyl-3,5-dimethylbenzenesulfonate, tribenzylsilyl-3,5-dimethylbenzenesulfonate, ethyldimethylsilyl-3,5-dimethylbenzenesulfonate, dimethylpropylsilyl-3,5-dimethylbenzenesulfonate, dimethylisopropylsilyl-3,5-dimethylbenzenesulfonate, butyldimethylsilyl-3,5-dimethylbenzenesulfonate, t-butyldimethylsilyl-3,5-dimethylbenzenesulfonate, dimethyloctylsilyl-3,5-dimethylbenzenesulfonate, diethylisopropylsilyl-3,5-dimethylbenzenesulfonate, octyldiisopropylsilyl-3,5-dimethylbenzenesulfonate, dimethylphenylsilyl-3,5-dimethylbenzenesulfonate, dimethylphenethylsilyl-3,5-dimethylbenzenesulfonate, benzyldimethylsilyl-3,5-dimethylbenzenesulfonate, vinyldimethylsilyl-3,5-dimethylbenzenesulfonate, allyldimethylsilyl-3,5-dimethylbenzenesulfonate, trimethylsilyl-3,5-dimethylbenzenesulfonate, 1-(trimethylsilyl)ethyl-3,5-dimethylbenzenesulfonate, 2-(trimethylsilyl)ethyl-3,5-dimethylbenzenesulfonate, 3-(trimethylsilyl)propyl-3,5-dimethylbenzenesulfonate, and the like.

In this connection, the molecular weight of the compound represented by the formula (3) is usually 400 or less, preferably 300 or less. When the molecular weight is too large, there is a possibility that an effect of improvement of the continuous charge characteristics according to the invention cannot satisfactory be exhibited owing to poor solubility to the electrolyte.

In the above formula (4), each of $R^9$ to $R^{12}$ independently represents a hydrogen atom or a hydrocarbon group having 1 to 8 carbon atoms. Examples of the hydrocarbon group include alkyl groups having 1 to 8 carbon atoms, such as a methyl group, an ethyl group, a propyl group, an isopropyl group, and a butyl group; alkenyl groups having 2 to 8 carbon atoms, such as a vinyl group, an isopropenyl group, and an allyl group; aryl groups having 6 to 8 carbon atoms, such as a phenyl group, a tolyl group, an ethylphenyl group, and a dimethylphenyl group; aralkyl groups having 7 to 8 carbon atoms, such as a benzyl group and a phenethyl group. Of these, preferred is a hydrogen atom, an alkyl group having 1 to 4 carbon atoms or an alkenyl group having 2 to 4 carbon atoms, and more preferred is a methyl group or an ethyl group.

In the case that $R^9$ and $R^{10}$ or $R^{11}$ and $R^{12}$ are combined with each other to form a ring, an aliphatic hydrocarbon ring having 3 to 8, preferably 5 to 6 carbon atoms inclusive of the carbon atom to which $R^9$ and $R^{10}$ or $R^{11}$ and $R^{12}$ are attached. In the case that $R^{10}$ and $R^{11}$ are combined with each other, examples of the bond include a single bond, —$CH_2$—, —$CH_2CH_2$—, and the like, and preferred is a single bond.

The following are mentioned as specific examples of the compound represented by the formula (4). Of these, preferred are 1,4-thioxane-1,1-dioxide derivatives.

(ix) 1,4-Thioxane-1,1-dioxide derivatives: There are mentioned 1,4-thioxane-1,1-dioxide ($R^9$ to $R^{12}$=H), 3-methyl-1,4-thioxane-1,1-dioxide ($R^9$=methyl group, $R^{10}$ to $R^{12}$=H), 3-ethyl-1,4-thioxane-1,1-dioxide ($R^9$=ethyl group, $R^{10}$ to $R^{12}$=H), 3-propyl-1,4-thioxane-1,1-dioxide ($R^9$=propyl group, $R^{10}$ to $R^{12}$=H), 3-butyl-1,4-thioxane-1,1-dioxide ($R^9$=butyl group, $R^{10}$ to $R^{12}$=H), 3,5-dimethyl-1,4-thioxane-1,1-dioxide ($R^9$ and $R^{11}$=methyl group, $R^{10}$ and $R^{12}$=H), 3,5-diethyl-1,4-thioxane-1,1-dioxide ($R^9$ and $R^{11}$=ethyl group, $R^{10}$ and $R^{12}$=H), 3-ethyl-5-methyl-1,4-thioxane-1,1-dioxide ($R^9$=ethyl group, $R^{11}$=methyl group, $R^{10}$ and $R^{12}$=H), 3-phenyl-1,4-thioxane-1,1-dioxide ($R^9$=phenyl group, $R^{10}$ to $R^{12}$=H), 3-vinyl-1,4-thioxane-1,1-dioxide ($R^9$=vinyl group, $R^{10}$ to $R^{12}$=H), 3-allyl-1,4-thioxane-1,1-dioxide ($R^9$=allyl group, $R^{10}$ to $R^{12}$=H), 3-benzyl-1,4-thioxane-1,1-dioxide ($R^9$=benzyl group, $R^{10}$ to $R^{12}$=H), and the like.

Of these, preferred are 1,4-thioxane-1,1-dioxide derivatives wherein each of $R^9$ to $R^{12}$ is a hydrogen atom, a methyl group, or an ethyl group, such as 1,4-thioxane-1,1-dioxide, 3-methyl-1,4-thioxane-1,1-dioxide, 3-ethyl-1,4-thioxane-1,1-dioxide, and 3,5-dimethyl-1,4-thioxane-1,1-dioxide. Particularly preferred are 1,4-thioxane-1,1-dioxide and 3-methyl-1,4-thioxane-1,1-dioxide.

(x) 3,4-Epoxytetrahydrothiophene-1,1-dioxide derivatives: There are mentioned 3,4-epoxytetrahydrothiophene-1,1-dioxide ($R^{10}$ and $R^{11}$ form a single bond, $R^9$ and $R^{12}$=H), 1-methyl-6-oxa-3-thia-bicyclo(3.1.0)hexane-3,3-dioxide ($R^{10}$ and $R^{11}$ form a single bond, $R^9$=methyl group, $R^{12}$=H), 1-ethyl-6-oxa-3-thia-bicyclo(3.1.0)hexane-3,3-dioxide ($R^{10}$ and $R^{11}$ form a single bond, $R^9$=ethyl group, $R^{12}$=H), 1-propyl-6-oxa-3-thia-bicyclo(3.1.0)hexane-3,3-dioxide ($R^{10}$ and $R^{11}$ form a single bond, $R^9$=propyl group, $R^{12}$=H), 1-butyl-6-oxa-3-thia-bicyclo(3.1.0)hexane-3,3-dioxide ($R^{10}$ and $R^{11}$ form a single bond, $R^9$=butyl group, $R^{12}$=H), 1,5-dimethyl-6-oxa-3-thia-bicyclo(3.1.0)hexane-3,3-dioxide ($R^{10}$ and $R^{11}$ form a single bond, $R^9$ and $R^{12}$=methyl group), 1,5-diethyl-6-oxa-3-thia-bicyclo(3.1.0)hexane-3,3-dioxide ($R^{10}$ and $R^{11}$ form a single bond, $R^9$ and $R^{12}$=ethyl group), and the like.

Of these, preferred are 3,4-epoxytetrahydrothiophene-1,1-dioxides wherein the tetrahydrothiophene may be substituted with a methyl group each at the 3- and 4-positions, such as 3,4-epoxytetrahydrothiophene-1,1-dioxide, 1-methyl-6-oxa-3-thia-bicyclo(3.1.0)hexane-3,3-dioxide, and 1,5-dimethyl-6-oxa-3-thia-bicyclo(3.1.0)hexane-3,3-dioxide. Particularly, preferred is 3,4-epoxytetrahydrothiophene-1,1-dioxide.

In this connection, the molecular weight of the compound represented by the formula (4) is usually 250 or less, preferably 180 or less. When the molecular weight is too large, there is a possibility that the effects of improvement of the high-temperature storage characteristics and the continuous charge characteristics according to the invention cannot satisfactory be exhibited owing to poor solubility to the electrolyte.

In the above formula (5), each of $R^{13}$ to $R^{15}$ independently represents an alkyl group having 1 to 12 carbon atoms which may be substituted with fluorine atom(s), an alkenyl group having 2 to 12 carbon atoms which may be substituted with fluorine atom(s), an aryl group having 6 to 12 carbon atoms which may be substituted with fluorine atom(s) or an aralkyl group having 7 to 12 carbon atoms which may be substituted with fluorine atom(s).

Examples of the alkyl group having 1 to 12 carbon atoms include a methyl group, an ethyl group, an n-propyl group, an i-propyl group, an n-butyl group, an i-butyl group, a sec-butyl group, a tert-butyl group, a pentyl group, and the like. Of theses, preferred are alkyl groups having 1 to 8 carbon atoms, particularly alkyl groups having 1 to 4 carbon atoms.

Examples of the alkenyl groups having 2 to 12 carbon atoms include a vinyl group, a propenyl group, and the like. Preferred are those having 2 to 8 carbon atoms, particularly those having 2 to 4 carbon atoms.

Examples of the aryl group having 6 to 12 carbon atoms include a phenyl group, a tolyl group, a xylyl group, and the like. Of these, preferred is a phenyl group.

Examples of the aralkyl group having 7 to 12 carbon atom include a benzyl group, a phenethyl group, and the like.

In these alkyl group, alkenyl group, aryl group, and aralkyl group, a part of or all of hydrogen atoms may be substituted with fluorine atoms but preferred are those which are not substituted with any fluorine atom.

$R^{14}$ and $R^{15}$ may be combined with each other to form a nitrogen-containing aliphatic ring and, as the nitrogen-containing aliphatic ring, pyrrolidine, piperidine, and the like are mentioned.

$R^{13}$ and $R^{14}$ may be combined with each other to form a cyclic structure and, as the cyclic structure, sultams are mentioned.

Specific examples of the compound represented by the formula (5) include methanesulfonamides such as N,N-dimethylmethanesulfonamide, N,N-diethylmethanesulfonamide, N,N-dipropylmethanesulfonamide, N-methyl-N-ethylmethanesulfonamide, N-methyl-N-benzylmethanesulfonamide, 1-methanesulfonylpyrrolidine, 1-methanesulfonylpiperidine, and N,N-bistrifluoromethylmethanesulfonamide; ethanesulfonamides such as N,N-diethylethanesulfonamide, N,N-dimethylethanesulfonamide, and N-methyl-N-ethylethanesulfonamide; vinylsulfonamides such as N,N-dimethylvinylsulfonamide; benzenesulfonamides such as N,N-dimethylbenzenesulfonamide, N,N-diethylbenzenesulfonamide, N,N-dipropylbenzenesulfonamide, and N,N-dibutylbenzenesulfonamide; trifluoromethanesulfonamides such as N,N-dimethyltrifluoromethanesulfonamide and N,N-bistrifluoromethyltrifluoromethanesulfonamide; pentafluoroethanesulfonamides such as N,N-dimethylpentafluoroethanesulfonamide; sultams such as N-methylpropanesultam, N-ethylpropanesultam, N-butylpropanesultam, N-methylbutanesultam, N-ethylbutanesultam, N-propylbutanesultam; and the like.

Of these, preferred are methanesulfonamides and ethanesulfonamides. Because of little gas generation and high residual capacity after high-temperature storage, particularly preferred are N,N-dimethylmethanesulfonamide, N,N-diethylmethanesulfonamide, N,N-diethylethanesulfonamide, and N,N-dimethylethanesulfonamide.

[B]: Fluorine-Containing Aromatic Compounds Having 9 Carbon Atoms or Less:

Examples of the fluorine-containing aromatic compounds having 9 carbon atoms or less include fluorobenzene, 1,2-difluorobenzene, 1,3-difluorobenzene, 1,4-difluorobenzene, 1,2,3-trifluorobenzene, 1,2,4-trifluorobenzene, 1,3,5-trifluorobenzene, 1,2,3,4-tetrafluorobenzene, 1,2,3,5-tetrafluorobenzene, 1,2,4,5-tetrafluorobenzene, pentafluorobenzene, hexafluorobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, benzotrifluoride, 2-fluorobenzotrifluoride, 3-fluorobenzotrifluoride, 4-fluorobenzotrifluoride, 3-fluoro-o-xylene, 4-fluoro-o-xylene, 2-fluoro-m-xylene, 5-fluoro-m-xylene, 2-methylbenzotrifluoride, 3-methylbenzotrifluoride, 4-methylbenzotrifluoride, octafluorotoluene, and the like. Of these, preferred are fluorobenzene, 1,2-difluorobenzene, 1,3-difluorobenzene, 1,4-difluorobenzene, 2-fluorotoluene, and 3-fluorotoluene, and particularly preferred is fluorobenzene.

The fluorine-containing aromatic compound having 10 carbon atoms or more is not preferred because the load characteristics are decreased.

At least one compound selected from the group consisting of the above [A] and [B] (hereinafter sometimes abbreviated as "additive") may be used singly or as a mixture of two or more thereof. At that time, the compounds selected from the same compound group or different compound groups can be used in combination.

The adding amount of the additive is not particularly limited but the total amount may be usually 0.01% by weight or more based on the nonaqueous electrolyte. When the amount is smaller that the value, high-temperature storage characteristics, continuous charge characteristics, and the like cannot be improved. The additive is incorporated so that the amount becomes preferably 0.05% by weight or more, more preferably 0.1% by weight or more, particularly preferably 0.3% by weight or more.

To the contrary, when the ratio of the additive in the nonaqueous electrolyte is too large, the ion conductivity is lowered and hence battery characteristics such as rate characteristics are deteriorated. Therefore, although the upper limit depends on the chemical species of the additive, the limit is usually 15% by weight or less, preferably 10% by weight or less, more preferably 7% by weight or less, particularly preferably 5% by weight or less. Furthermore, in the case of using at least one compound selected from the group consisting of [A] as the additive, the amount is further preferably 3% by weight or less.

In this connection, in the case of using a compound represented by the formula (1) or (2) of [A] as the additive, the total content of the additive is preferably 0.01 to 15% by weight, more preferably 0.1 to 7% by weight, most preferably 3% by weight or less based on the nonaqueous electrolyte. In the case of using a compound represented by the formula (3) of [A], the total content of the additive is more preferably 0.01 to 15% by weight, most preferably 3% by weight or less based the nonaqueous electrolyte. In the case of using a compound represented by the formula (4) of [A], the total content of the additive is more preferably 0.01 to 10% by weight, most preferably 0.1 to 2.5% by weight or less based on the nonaqueous electrolyte.

In the case of using a compound represented by the formula (5) of [A], the total content of the additive is more preferably 0.01 to 5% by weight based on the nonaqueous electrolyte. Moreover, in the case of using a compound of [B] as the additive, the total content of the additive is more preferably 0.01 to 10% by weight based on the nonaqueous electrolyte.

The nonaqueous electrolyte according to the present invention comprises, in addition to the above additives, at least one compound selected from the group consisting of acid anhydrides and carbonic esters having an unsaturated bond in the nonaqueous organic solvent.

Examples of the acid anhydride include carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride.

The carbonic ester having an unsaturated bond is not particularly limited as far as it has a carbon-carbon double bond or a carbon-carbon triple bond in the molecule and may be either of linear one or cyclic one.

Example of the carbonic ester having an unsaturated bond include vinylene carbonate compounds such as vinylene carbonate, methylvinylene carbonate, ethylvinylene carbonate, 4,5-dimethylvinylene carbonate, 4,5-diethylvinylene carbonate, fluorovinylene carbonate, trifluoromethylvinylene carbonate, phenylvinylene carbonate, and 4,5-diphenylvinylene carbonate; vinylethylene carbonate compounds such as vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, 4,5-divinylethylene carbonate, phenylethylene carbonate, and 4,5-diphenylethylene carbonate; methyleneethylene carbonate compounds such as 4,4-dimethyl-5-methyleneethylene carbonate and 4,4-diethyl-5-methyleneethylene carbonate; phenyl carbonate compounds such as diphenyl carbonate, methyl phenyl carbonate, and t-butyl phenyl carbonate; vinyl carbonate compounds such as divinyl carbonate and methyl vinyl carbonate; allyl carbonate compounds such as diallyl carbonate and allyl methyl carbonate; and the like.

Of these, preferred are unsaturated cyclic carbonic esters such as vinylene carbonate compounds and ethylene carbonate compounds substituted with an aromatic ring or a substituent having a carbon-carbon unsaturated bond. In particular, preferred is vinylene carbonate, 4,5-dimethylvinylene carbonate, 4,5-diphenylvinylene carbonate, vinylethylene carbonate, 4-methyl-4-vinylethylene carbonate, or 4,5-divinylethylene carbonate, and particularly preferred is vinylene carbonate or vinylethylene carbonate.

These compounds may be used singly or in combination of two or more thereof. At that time, the compounds selected from the same compound group or different compound groups can be used in combination.

The cycle characteristics of the cell can be improved by incorporating into the electrolyte at least one compound selected from the group consisting of acid anhydrides and carbonic esters having an unsaturated bond in the molecule. The reason is not clear but is presumed that a stable protective film can be formed on the surface of the negative electrode. When the content is small, the characteristics are not sufficiently improved.

In this connection, there is a problem that the incorporation of at least one compound selected from the group consisting of acid anhydrides and carbonic esters having an unsaturated bond in the electrolyte generally increases gas generation, but the combined use of the aforementioned additive compound can suppress the increase of gas generation. However, when the content is too large, gas generates during the storage at a high temperature to increase the inner pressure of the battery in some cases, so that the content is preferably within the following range.

The ratio of at least one compound selected from the group consisting of acid anhydrides and carbonic esters having an unsaturated bond in the molecule in the nonaqueous electrolyte is usually 0.01% by weight or more, preferably 0.05% by weight or more, particularly preferably 0.1% by weight or more, most preferably 0.3% by weight or more and usually 10% by weight or less, preferably 8% by weight or less, particularly preferably 5% by weight or less, most preferably 4% by weight or less.

In this connection, in the case of using a compound represented by the formula (4) of [A], the ratio of the acid anhydride and/or carbonic esters having an unsaturated bond in the molecule in the nonaqueous electrolyte is more preferably 0.01 to 10% by weight, most preferably 0.3 to 5% by weight. In the case of using a compound represented by the formula (5) of [A], the ratio of the acid anhydride and/or carbonic esters having an unsaturated bond in the molecule in the nonaqueous electrolyte is more preferably 0.01 to 8% by weight. In the case of using a compound of [B], the ratio of the acid anhydride and/or carbonic esters having an unsaturated bond in the molecule in the nonaqueous electrolyte is more preferably 0.01 to 8% by weight.

In the present invention, the main ingredients of the nonaqueous electrolyte are, like usual nonaqueous electrolytes, a lithium salt and nonaqueous organic solvent that dissolves the salt.

The lithium salt is not particularly limited as far as it is a salt known to be usable in this application and any one can be used. Specifically, the following may be mentioned.

1) Inorganic lithium salts: inorganic fluorides such as $LiPF_6$, $LiAsF_6$, $LiBF_4$, and $LiSbF_6$, inorganic chlorides such as $LiAlCl_4$, perhalogenates such as $LiClO_4$, $LiBrO_4$, and $LiIO_4$.

2) Organic lithium salts: fluorine-containing organic lithium salts, e.g., perfluoroalkanesulfonates such as $LiCF_3SO_3$ and $LiC_4F_9SO_3$, perfluoroalkanecarboxylates such as $LiCF_3COO$, perfluoroalkanecarbonimides such as $LiN(CF_3CO)_2$, perfluoroalkanesulfonimides such as $LiN(CF_3SO_2)_2$, $LiN(C_2F_5SO_2)_2$, and $LiN(CF_3SO_2)(C_4F_9SO_2)$, perfluoroalkanesulfonic methides such as $LiC(CF_3SO_2)_3$, organic phosphates having perfluoroalkane group(s), such as $LiPF_4(CF_3)$, $LiPF_4(C_2F_5)$, $LiPF_4(CF_3SO_2)_2$, and $LiPF_4(C_2F_5SO_2)_2$, and organic borates having perfluoroalkane group(s), such as $LiBF_2(CF_3)_2$, $LiBF_2(C_2F_5)_2$, $LiBF_2(CF_3SO_2)_2$, and $LiBF_2(C_2F_5SO_2)_2$.

The lithium salts may be used singly or as a mixture of two or more thereof. Of these, suitably used is a lithium salt particularly selected from the group consisting of $LiPF_6$, $LiBF_4$, $LiCF_3SO_3$, $LiN(CF_3SO_2)_2$, and $LiN(C_2F_5SO_2)_2$, which are easily soluble in a solvent and shows a high degree of dissociation, and in particular, $LiPF_6$ or $LiBF_4$ is preferred. Moreover, the combined use of the inorganic lithium salt such as $LiPF_6$ or $LiBF_4$ and the fluorine-containing organic lithium salt such as $LiCF_3SO_3$, $LiN(CF_3SO_2)_2$, or $LiN(C_2F_5SO_2)_2$ is preferred because gas generation during continuous charging is suppressed and deterioration after high-temperature storage is reduced. Particularly, preferred are those wherein the content of $LiPF_6$ or $LiBF_4$ in the lithium salts in the electrolyte is 70 to 98% by weight and the content of the fluorine-containing organic lithium salt selected from the group consisting of $LiCF_3SO_3$, $LiN(CF_3SO_2)_2$, and $LiN(C_2F_5SO_2)_2$ is 30 to 2% by weight.

In the case that the nonaqueous solvent comprises γ-butyrolactone in an amount of 55% by volume or more, it is preferred to use $LiBF_4$ in an amount of 50% by weight or more based on the total lithium salts. Particularly preferred are those wherein the content of $LiBF_4$ in the lithium salts is 50 to 95% by weight and the content of the lithium salt selected from the group consisting of $LiPF_6$, $LiCF_3SO_3$, $LiN(CF_3SO_2)_2$, and $LiN(C_2F_5SO_2)_2$ is 5 to 50% by weight.

The concentration of the lithium salt(s) in the nonaqueous electrolyte is in the range of usually 0.5 mol/liter or more, preferably 0.75 mol/liter or more and usually 3 mol/liter or less, preferably 2 mol/liter or less, more preferably 1.75 mol/liter or less. When the concentration is too low, the electric conductivity of the electrolyte is insufficient. When the concentration is too high, the electric conductivity decreases due to increased viscosity and precipitation at a low temperature is apt to occur, so that cell performances tend to deteriorate.

The nonaqueous organic solvent can be suitably selected from among those hitherto proposed as the solvents for nonaqueous electrolytes and used. For example, linear saturated carbonic esters, cyclic saturated carbonic esters, linear esters, cyclic esters (lactone compounds), linear ethers, cyclic ethers, sulfur-containing organic solvents, phosphorus-containing organic solvents, and the like are mentioned.

Of these, usually preferred are linear saturated carbonic esters, cyclic saturated carbonic esters, linear esters, cyclic esters, linear ethers, cyclic ethers, and phosphorus-containing organic solvents as solvents exhibiting a high conductivity. These compounds preferably have each 3 to 9 carbon atoms in total.

Specific examples thereof include the following.

1) Linear saturated carbonic esters: There are mentioned linear saturated carbonic esters containing alkyl groups each having 1 to 4 carbon atoms, such as dimethyl carbonate, diethyl carbonate, di-n-propyl carbonate, ethyl methyl carbonate, methyl n-propyl carbonate, and ethyl n-propyl carbonate. Of these, dimethyl carbonate, diethyl carbonate, or ethyl methyl carbonate is preferred.

2) Cyclic saturated carbonic esters: There are mentioned cyclic saturated carbonic esters containing an alkylene group having 2 to 4 carbon atoms, such as ethylene carbonate, propylene carbonate, and butylene carbonate. Of these, ethylene carbonate or propylene carbonate is preferred.

3) Linear ethers: There are mentioned dimethoxymethane, 1,2-dimethoxyethane, 1,2-diethoxyethane, diethyl ether, and the like.

4) Cyclic ethers: There are mentioned tetrahydrofuran, 2-methyltetrahydrofuran, 1,3-dioxolan, 4-methyl-1,3-dioxolan, and the like.

5) Linear esters: There are mentioned methyl formate, methyl acetate, methyl propionate, methyl butyrate, and the like.

6) Cyclic esters: There are mentioned γ-butyrolactone, γ-valerolactone, and the like.

7) Phosphorus-containing organic solvent: There are mentioned trimethyl phosphate, triethyl phosphate, dimethyl ethyl phosphate, methyl diethyl phosphate, ethylene methyl phosphate, ethylene ethyl phosphate, and the like.

These may be used singly or in combination of two or more thereof, but the combined use of two or more compounds is preferred. For example, it is preferred to use a solvent having a high dielectric constant, such as a cyclic saturated carbonic ester or a cyclic ester, and a solvent having a low viscosity, such as a linear saturated carbonic ester or a linear ester, in combination.

One of the preferred combinations of the nonaqueous solvents is a combination of mainly a cyclic saturated carbonic ester and a linear saturated carbonic ester. In particular, preferred is a combination in which the total content of the cyclic saturated carbonic ester and the linear saturated carbonic ester is 90% by volume or more, preferably 95% by volume or more and the volume ratio of the cyclic saturated carbonic esters and the linear saturated carbonic esters is 20:80 to 45:55. The nonaqueous electrolyte obtained by incorporating a lithium salt and the aforementioned additives into the mixed solvent is preferable because improved balance of cycle characteristics, large-current discharge characteristics, and suppression of gas generation.

The other preferred one among the nonaqueous solvents is a solvent containing 60% by volume or more of an organic solvent selected from the group consisting of ethylene carbonate, propylene carbonate, γ-butyrolactone, and γ-valerolactone. The electrolyte obtained by incorporating a lithium salt and the aforementioned additives into the mixed solvent reduces the evaporation of the solvent and the leakage of the liquid even when used at a high temperature. In particular, preferred is a combination in which the total content of ethylene carbonate and γ-butyrolactone is 80% by volume or more, preferably 90% by volume or more, more preferably 95% by volume or more and the volume ratio of ethylene carbonate and γ-butyrolactone is 5:95 to 45:55 or a combination in which the total content of ethylene carbonate and propylene carbonate is 80% by volume or more, preferably 90% by volume or more, more preferably 95% by volume or more and the volume ratio of ethylene carbonate and propylene carbonate is 30:70 to 60:40. The use of the nonaqueous electrolyte obtained by incorporating a lithium salt and the aforementioned additives into the mixed solvent is preferable because reduced gas generation and improved balance of cycle characteristics, large-current discharge characteristics, and the like.

Also, it is preferred to use a phosphorus-containing organic solvent as the nonaqueous solvent. The incorporation of the phosphorus-containing organic solvent in an amount of usually 10% by volume or more, preferably 10 to 80% by volume in a nonaqueous solvent can lower the combustibility of the electrolyte. In particular, a combined use of the phosphorus-containing organic solvent and a nonaqueous solvent selected from the group consisting of ethylene carbonate, propylene carbonate, γ-butyrolactone, γ-valerolactone, and dialkyl carbonate is preferred because of a good balance of cycle characteristics and large-current discharge characteristics.

Herein, the volume of the nonaqueous solvent is expressed by a measured value at 25° C. but, when it is solid at 25° C., the volume is expressed by a measured value at the melting point.

The nonaqueous electrolyte according to the present invention may comprise various auxiliary agents such as an overcharge inhibitor, an acid remover, a dehydrating agent, and the like.

Examples of the overcharge inhibitor include aromatic compounds such as biphenyl, alkylbiphenyls, terphenyl, partially hydrogenated products of terphenyl, cyclohexylbenzene, t-butylbenzene, t-amylbenzene, diphenyl ether, and dibenzofuran; partially fluorinated products of the above aromatic compounds, such as 2-fluorobiphenyl, o-cyclohexylfluorobenzene, and p-cyclohexylfluorobenzene; fluorine-containing anisole compounds such as 2,4-difluoroanisole, 2,5-difluoroanisole, and 2,6-difluoroanisole; and the like. The ratio of the overcharge inhibitor in the nonaqueous electrolyte is usually 0.1% by weight or more and 5% by weight or less. The incorporation of the overcharge inhibitor can inhibit the burst and firing of the battery at overcharge or the like situation.

Examples of the other auxiliary agents include carbonic ester compounds such as fluoroethylene carbonate, trifluoropropylene carbonate, erythritan carbonate, and spiro-bis-dimethylene carbonate; carboxylic esters such as vinyl acetate, divinyl adipate, allyl acetate; sulfur-containing compounds such as dimethyl sulfite, ethylene sulfite, 1,3-propanesultone, 1,4-butanesultone, methyl methanesulfonate, 2-propynyl methanesulfonate, sulfolane, sulfolene, dimethyl sulfone, divinyl sulfone, tetramethylthiuram monosulfide, diphenyl disulfide, and 1,4-butanediol dimethanesulfonate: nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, and cycloheptane; and the like.

The ratio of these auxiliary agents in the nonaqueous electrolyte is usually 0.1% by weight or more and 5% by weight or less. The incorporation of these auxiliary agents can improve capacity-retention characteristics after high-temperature storage and cycle characteristics.

The nonaqueous electrolyte according to the invention can be prepared by dissolving a lithium salt, aforementioned additives, a compound selected from acid anhydrides and carbonic esters having an unsaturated bond, and, if necessary, the other compound in a nonaqueous organic solvent. At the preparation of the nonaqueous electrolyte, individual raw materials are preferably dehydrated beforehand. It is suitable to dehydrate them to the water content of usually 50 ppm, preferably 30 ppm.

The nonaqueous electrolyte according to the invention is suitable for use as an electrolyte for secondary battery, especially for lithium secondary battery. The following will describe the lithium secondary battery according to the invention employing the electrolyte.

The lithium secondary battery according to the invention is the same as the hitherto known lithium secondary battery with the exception of the electrolyte, and usually, a positive electrode and a negative electrode are placed in a case through a porous film which is impregnated with the nonaqueous electrolyte according to the invention. Therefore, the form of the secondary battery according to the invention is no particular limitation, and the battery may be in any of a cylindrical shape, a prismatic shape, a laminate shape, a coin shape, a large one, etc. The lithium secondary battery according to the invention can prevent the abnormal working of a circuit breaker in a continuous charge state of the battery equipped with a circuit breaker which works when the inner pressure of the battery increases at an abnormal situation such as overcharge. Moreover, in the battery whose outer package material is mainly metal aluminum or an aluminum alloy, there is apt to occur a problem of battery swelling to be induced by the increase of inner pressure of the battery but the lithium secondary battery according to the invention can prevent the occurrence of such a problem because of reduced gas generation.

As the negative active material, use can be made of carbonaceous materials which can intercalate and release lithium; metal oxide materials which can intercalate and release lithium, such as tin oxide and silicon oxide; lithium metal; various lithium alloys; and the like. These negative active materials may be used singly or as a mixture of two or more thereof.

As the carbonaceous materials capable of intercalating and releasing lithium, preferred are graphite and materials obtained by covering the surface of graphite with a carbon more amorphous than graphite.

As graphite, preferred are those having a "d" value (interlayer distance) for lattice plane (002) determined by X-ray diffraction analysis based on the method of Gakushin (Japan Society for the Promotion of Science) of 0.335 to 0.338 nm, particularly 0.335 to 0.337 nm. The crystallite size "Lc" determined by X-ray diffraction analysis based on the method of Gakushin is usually 30 nm or larger, preferably 50 nm or larger, and particularly preferably 100 nm or larger. The ash content is usually 1% by weight or less, preferably 0.5% by weight or less, and particularly preferably 0.1% by weight or less.

Preferred materials obtained by covering the surface of graphite with a carbon more amorphous than graphite are those in which a graphite material having a "d" value for lattice plane (002) determined by X-ray diffraction analysis of 0.335 to 0.338 nm is used as a nucleus material and a carbonaceous material having a "d" value for lattice plane (002) determined by X-ray diffraction analysis larger than the value of the nucleus material is attached to the surface and the ratio of the nucleus material to the carbonaceous material having a "d" value for lattice plane (002) determined by X-ray diffraction analysis larger than the value of the nucleus material is 99/1 to 80/20 by weight. By the use of the material, a negative electrode having high capacity and hardly reactive with the electrolyte can be produced.

The particle size of the carbonaceous materials is, as a median diameter determined by the laser diffraction-scattering method, usually 1 μm or more, preferably 3 μm or more, more preferably 5 μm or more, most preferably 7 μm or more and usually 100 μm or less, preferably 50 μm or less, more preferably 40 μm or less, most preferably 30 μm or less.

The specific surface area of the carbonaceous material determined by the BET method is usually 0.3 $m^2/g$ or more, preferably 0.5 $m^2/g$ or more, more preferably 0.7 $m^2/g$ or more, most preferably 0.8 $m^2/g$ or more and usually 25.0 $m^2/g$ or less, preferably 20.0 $m^2/g$ or less, more preferably 15.0 $m^2/g$ or less, most preferably 10.0 $m^2/g$ or less.

Moreover, the carbonaceous material preferably has an "R" value ($=I_B/I_A$) determined by the ratio of $I_B$ to $I_A$ of 0.01 to 0.7, wherein "$I_A$" is an intensity of peak "$P_A$" within the range of 1570 to 1620 $cm^{-1}$ and "$I_B$" is an intensity of peak "$P_B$" within the range of 1300 to 1400 $cm^{-1}$ when analyzed by raman spectrometry using an argon ion laser. A half-band width of the peak within the range of 1570 to 1620 $cm^{-1}$ is preferably 26 $cm^{-1}$ or less, and more preferably 25 $cm^{-1}$ or less.

As the positive active material, there are mentioned lithium-transition metal compound oxides such as lithium cobalt oxide, lithium nickel oxide, and lithium manganese oxide, which are capable of intercalating and releasing lithium.

As binders for binding the active materials, any materials stable to solvents to be used at the production of electrodes and the electrolyte can be employed. Examples thereof include fluorine polymers such as polyvinylidene fluoride and polytetrafluoroethylene, polyolefins such as polyethylene and polypropylene, polymers having an unsaturated bond and copolymers thereof, such as styrene-butadiene rubbers, isoprene rubbers, butadiene rubbers, and acrylic polymers and copolymers thereof, such as ethylene-acrylic acid copolymers and ethylene-methacrylic acid copolymers.

In order to enhance mechanical strength and electric conductivity, a thickener, a conductive material, a filler, and the like may be incorporated.

Examples of the thickener include carboxymethyl cellulose, methyl cellulose, hydroxymethyl cellulose, ethyl cellulose, polyvinyl alcohol, starch oxide, starch phosphate and casein.

Examples of the conductive material include metal materials such as copper and nickel or carbonaceous materials such as graphite and carbon black.

The production of the electrodes may be effected according to a usual manner. For example, the negative or positive active material may be added with a binder, thickener, conductive material, solvent and the like to thereby prepare a slurry, and the resulting slurry is applied onto a current collector, which is followed by drying and then pressing to form an electrode.

The density of the negative active material layer after drying and pressing is usually 1.45 $g/cm^3$ or more, preferably 1.55 $g/cm^3$ or more, particularly preferably 1.60 $g/cm^3$ or more. A higher density of the negative active material layer results in an increased capacity of the battery and hence is preferred. Moreover, the density of the positive active material layer after drying and pressing is usually 3.0 $g/cm^3$. When the density of the positive active material layer is too low, an insufficient capacity of the battery is obtained.

Various materials can be used as the current collector but a metal or its alloy is usually employed. Examples of the current collector for the negative electrode include copper, nickel, stainless steel, and the like, and preferred is copper. Examples of the current collector for the positive electrode include metals such as aluminum, titanium, tantalum, and alloys thereof. Of these, preferred is aluminum or an alloy thereof.

A porous film is interposed between the positive electrode and the negative electrode in order to prevent short-circuit. The material and shape of the porous film are not specifically limited as far as the film is excellent in stability to the electrolytic solution and in retention of the liquid. Preferred is a porous sheet or non-woven fabric, made of a polyolefin such as polyethylene or polypropylene.

The material of the outer package of the battery for use in the invention is also optional, and nickel-plated iron, stainless steel, aluminum or its alloys, nickel, titanium, and the like may be employed.

EXAMPLES

The following will further describe specific embodiments of the invention with reference to Examples, but the invention should not be construed to be limited by these Examples unless it exceeds the gist.

Example 1

Production of Positive Electrode

A positive electrode was obtained by mixing 90% by weight of lithium nickel compound oxide ($LiNi_{0.82}CO_{0.15}Al_{0.03}O_2$), 5% by weight of polyvinylidene fluoride (PVdF), and 5% by weight of acetylene black, adding N-methylpyrrolidone to form a slurry, and applying the slurry onto both surfaces of a current collector made of aluminum, followed by drying.

[Production of Negative Electrode]

A negative electrode was obtained by mixing 90% by weight of graphite powder and 10% by weight of PVdF, adding N-methylpyrrolidone to form a slurry, and applying the slurry onto one surface of a current collector made of copper, followed by drying.

[Blending of Electrolyte]

A base electrolyte was prepared by adding 2 parts by weight of vinylene carbonate to 100 parts by weight of a mixed solvent of ethylene carbonate and ethyl methyl carbonate (mixing ratio of 1:3 by volume) containing $LiPF_6$ in a ratio of 1.25 mol/L. To the base electrolyte was added 1 part by weight of 1,2,4-butanetriol trimethanesulfonate to thereby form an electrolyte.

[Production of Lithium Secondary Battery]

The above positive electrode, negative electrode, and a biaxially oriented porous polyethylene film having a film thickness of 16 μm, a void content of 45%, and an average pore size of 0.05 μm were each coated and impregnated with the above electrolyte and then they were laminated in the order of the negative electrode, the separator, the positive electrode, the separator, and the negative electrode.

The cell element thus obtained was first put between PET films and then, while the terminals of the positive electrode and the negative electrode was provided in an extended condition toward a laminate film obtained by covering an aluminum layer with resin layers, was vacuum-sealed to prepare a sheet-form lithium secondary battery. In order to further enhance the adhesiveness between the electrodes, the sheet-form battery was put between silicone rubbers and glass plates and then pressurized at 0.35 kg/cm². FIG. 1 shows a schematic cross-sectional view.

[Capacity Evaluation]

The discharge capacity of lithium nickel compound oxide per 1 hour was considered as 180 mAh/g and a discharge rate 1 C was determined based on the capacity and the weight of positive active material of the lithium secondary battery for evaluation to set a rate. Then, the battery was charged at 0.2 C to 4.2V and then discharged at 0.2 C to 3V to conduct initial formation. Thereafter, the battery was charged at 0.5 C to 4.2V and then again discharged at 0.2 C to 3V to determine a discharge capacity at 0.2 C. In this connection, the cut current at the charging was set at 0.05 C.

[Storage Characteristic Evaluation]

The battery after subjected to the capacity evaluation test was charged at 0.5 C to 4.2V and was stored in a constant-temperature bath at 85° C. for 1 day. Thereafter, the amount of gas generation was determined by immersing the battery into an ethanol bath to measure buoyant force (Archimedean principle). In addition, for evaluating the degree of capacity deterioration after the storage, the battery was charged at 0.5 C to 4.2V and then discharged at 0.2 C to measure a discharge capacity at 0.2 C after the storage, and a capacity recovery was determined according to the following equation. The results are shown in Table 1.

Capacity recovery(%)=Discharge capacity at 0.2 C after storage(mAh/g)/Discharge capacity at 0.2 C(mAh/g)

Example 2

A lithium secondary battery was prepared in the same manner as in Example 1 with the exception of the use of an electrolyte in which the amount of 1,2,4-butanetriol trimethanesulfonate added was changed to 3 parts by weight, and battery characteristic tests the same as in Example 1 were conducted. The results are shown in Table 1.

Example 3

A lithium secondary battery was prepared in the same manner as in Example 1 with the exception of the use of an electrolyte in which the amount of 1,2,4-butanetriol trimethanesulfonate added was changed to 5 parts by weight, and battery characteristic tests the same as in Example 1 were conducted. The results are shown in Table 1.

Referential Example 1

A lithium secondary battery was prepared in the same manner as in Example 1 with the exception of the use of an electrolyte in which 1,2,4-butanetriol trimethanesulfonate was added in an amount of 1 part by weight per 100 parts by weight of a mixed solvent of ethylene carbonate and diethyl carbonate (mixing ratio of 1:1 by volume) containing $LiPF_6$ in a ratio of 1.0 mol/L, and battery characteristic tests the same as in Example 1 were conducted. The results are shown in Table 1.

Comparative Example 1

A lithium secondary battery was prepared in the same manner as in Example 1 with the exception of the use of an electrolyte in which 1,2,4-butanetriol trimethanesulfonate was not added, and battery characteristic tests the same as in Example 1 were conducted. The results are shown in Table 1. The capacity recovery is low and also a large amount of gas is generated. Thus, it is understood that storage characteristics are very poor.

Comparative Example 2

A lithium secondary battery was prepared in the same manner as in Example 1 with the exception of the use of an electrolyte in which 1,4-butanediol dimethanesulfonate was added instead of 1,2,4-butanetriol trimethanesulfonate, and battery characteristic tests the same as in Example 1 were conducted. The results are shown in Table 1. An improvement in the capacity recovery is observed but an effect to suppress the gas generation is insufficient.

Example 4

Production of Positive Electrode

A positive electrode was obtained by mixing 90% by weight of lithium cobalt compound oxide ($LiCoO_2$), 5% by weight of polyvinylidene fluoride (PVdF), and 5% by weight of acetylene black, adding N-methylpyrrolidone thereto to form a slurry, and applying the slurry onto both surfaces of a current collector made of aluminum, followed by drying.

[Production of Negative Electrode]

A negative electrode was obtained by mixing 87.4% by weight of graphite powder, 9.7% by weight of PVdF, and 2.9% by weight of acetylene black, adding N-methylpyrrolidone thereto to form a slurry, and applying the slurry onto one surface of a current collector made of copper, followed by drying.

[Blending of Electrolyte]

A base electrolyte was prepared by adding 2 parts by weight of vinylene carbonate to 100 parts by weight of a mixed solvent of ethylene carbonate and ethyl methyl carbonate (mixing ratio of 1:3 by volume) containing $LiPF_6$ in a ratio of 1.25 mol/L. To the base electrolyte was added 1 part by weight of 1,2,4-butanetriol trimethanesulfonate to thereby form an electrolyte.

[Production of Lithium Secondary Battery]

The above positive electrode, negative electrode, and a biaxially oriented porous polyethylene film having a film thickness of 16 μm, a void content of 45%, and an average pore size of 0.05 μm were each coated and impregnated with the above electrolyte and then they were laminated in the order of the negative electrode, the separator, the positive electrode, the separator, and the negative electrode. The cell element thus obtained was first put between PET films and then, while the terminals of the positive electrode and the negative electrode was provided in an extended condition toward a laminate film obtained by covering both surfaces of an aluminum layer with resin layers, was vacuum-sealed to prepare a sheet-form lithium secondary battery. In order to further enhance the adhesiveness between the electrodes, the sheet-form battery was put between silicone rubber and glass plat and then pressurized at 0.35 kg/cm².

[Capacity Evaluation]

The discharge capacity of lithium cobalt compound oxide per 1 hour was considered as 138 mAh/g and a discharge rate 1 C was determined based on the capacity and the weight of positive active material of the lithium secondary battery for evaluation to set a rate. Then, the battery was charged at 0.2 C to 4.2V and then discharged at 0.2 C to 3V to conduct initial formation. Thereafter, the battery was charged at 0.5 C to 4.2V and then again discharged at 0.2 C to 3V to determine a discharge capacity at 0.2 C. In this connection, the cut current at the charging was set at 0.05 C.

[Storage Characteristic Evaluation]

The battery after subjected to the capacity evaluation test was charged at 0.5 C to 4.2V and was stored in a constant-temperature bath at 85° C. for 1 day. Thereafter, the amount of gas generation was determined by immersing the battery into an ethanol bath to measure buoyant force (Archimedean principle). In addition, for evaluating the degree of capacity deterioration after the storage, the battery was charged at 0.5 C to 4.2V and then discharged at 0.2 C to measure a discharge capacity at 0.2 C after the storage, and a capacity recovery was determined according to the aforementioned equation. The results are shown in Table 1.

Comparative Example 3

A lithium secondary battery was prepared in the same manner as in Example 4 with the exception of the use of an electrolyte in which 1,2,4-butanetriol trimethanesulfonate was not added, and battery characteristic tests the same as in Example 4 were conducted. The results are shown in Table 1. Since lithium cobalt compound oxide is used as the positive active material, the amount of gas generation after the storage is on a low level but the capacity recovery is insufficient.

Example 5

A lithium secondary battery was prepared in the same manner as in Example 4 with the exception of the use of an electrolyte in which 1,2,4-butanetriol trimethanesulfonate was added in an amount of 1 part by weight per 100 parts by weight of a mixed solvent of ethylene carbonate and ethyl methyl carbonate (mixing ratio of 1:3 by volume) containing $LiPF_6$ in a ratio of 1 mol/L, and a capacity evaluation test the same as in Example 4 was conducted.

Then, the battery was placed in a constant-temperature bath at 60° C. and was charged at a constant current at 0.7 C and, when the voltage reached 4.25V, switched to a constant-voltage charging. After charged for 7 days, the battery was immersed into an ethanol bath to measure buoyant force and the amount of gas generation was calculated from the buoyant force. The results are shown in Table 2.

Comparative Example 4

A lithium secondary battery was prepared in the same manner as in Example 5 with the exception of the use of an electrolyte in which 1,3-propanesultone was added instead of 1,2,4-butanetriol trimethanesulfonate, and battery characteristic tests the same as in Example 4 were conducted. The results are shown in Table 2.

Comparative Example 5

A lithium secondary battery was prepared in the same manner as in Example 5 with the exception of the use of an electrolyte in which 1,2,4-butanetriol trimethanesulfonate was not added, and battery characteristic tests the same as in Example 4 were conducted. The results are shown in Table 2.

TABLE 1

| | Additive | Added amount part by weight | Positive electrode | Electrolyte composition | Capacity recovery (%) | Amount of gas generation (cc) |
|---|---|---|---|---|---|---|
| Example 1 | 1,2,4-butanetriol trimethanesulfonate | 1 | lithium nickel compound oxide | 1.25M $LiPF_6$/EC + EMC(1:3) + VC2% | 83.0 | 0.19 |
| Example 2 | 1,2,4-butanetriol trimethanesulfonate | 3 | lithium nickel compound oxide | 1.25M $LiPF_6$/EC + EMC(1:3) + VC2% | 83.4 | 0.15 |
| Example 3 | 1,2,4-butanetriol trimethanesulfonate | 5 | lithium nickel compound oxide | 1.25M $LiPF_6$/EC + EMC(1:3) + VC2% | 82.9 | 0.13 |
| Referential Example 1 | 1,2,4-butanetriol trimethanesulfonate | 1 | lithium nickel compound oxide | 1.0M $LiPF_6$/EC + DEC(1:1) | 84.2 | 0.20 |
| Comparative Example 1 | none | — | lithium nickel compound oxide | 1.25M $LiPF_6$/EC + EMC(1:3) + VC2% | 80.6 | 0.79 |
| Comparative Example 2 | 1,4-butanediol dimethanesulfonate | 1 | lithium nickel compound oxide | 1.25M $LiPF_6$/EC + EMC(1:3) + VC2% | 83.0 | 0.38 |
| Example 4 | 1,2,4-butanetriol trimethanesulfonate | 1 | lithium cobalt compound oxide | 1.25M $LiPF_6$/EC + EMC(1:3) + VC2% | 81.7 | 0.06 |
| Comparative Example 3 | none | — | lithium cobalt compound oxide | 1.25M $LiPF_6$/EC + EMC(1:3) + VC2% | 77.8 | 0.11 |

TABLE 2

| | Additive | Added amount part by weight | Positive electrode | Electrolyte composition | Amount of gas generation after 7 days of continuous charging (ml) |
|---|---|---|---|---|---|
| Example 5 | 1,2,4-butanetriol trimethanesulfonate | 1 | lithium cobalt compound oxide | 1M $LiPF_6$/EC + EMC(1:3) + VC2% | 0.54 |
| Comparative Example 4 | 1,3-propanesultone | 1 | lithium cobalt compound oxide | 1M $LiPF_6$/EC + EMC(1:3) + VC2% | 0.66 |
| Comparative Example 5 | none | — | lithium cobalt compound oxide | 1M $LiPF_6$/EC + EMC(1:3) + VC2% | 0.73 |

Example 6

A lithium secondary battery was prepared in the same manner as in Example 1 with the exception of the use of an electrolyte in which 1 part by weight of 1,4-butanediol bis(2,2,2-trifluoroethanesulfonate) was added instead of 1 part by weight of 1,2,4-butanetriol trimethanesulfonate, and battery characteristic tests the same as in Example 1 were conducted. The results are shown in Table 3.

Example 7

A lithium secondary battery was prepared in the same manner as in Example 6 with the exception of the use of an electrolyte in which the amount of 1,4-butanediol bis(2,2,2-trifluoroethanesulfonate) added was changed to 3 parts by weight, and battery characteristic tests the same as in Example 1 were conducted. The results are shown in Table 3.

Example 8

A lithium secondary battery was prepared in the same manner as in Example 6 with the exception of the use of an electrolyte in which the amount of 1,4-butanediol bis(2,2,2-trifluoroethanesulfonate) added was changed to 5 parts by weight, and battery characteristic tests the same as in Example 1 were conducted. The results are shown in Table 3.

Referential Example 2

A lithium secondary battery was prepared in the same manner as in Referential Example 1 with the exception of the use of an electrolyte in which 1 part by weight of 1,4-butanediol bis(2,2,2-trifluoroethanesulfonate) was added instead of 1 part by weight of 1,2,4-butanetriol trimethanesulfonate, and battery characteristic tests the same as in Example 1 were conducted. The results are shown in Table 3.

Example 9

A lithium secondary battery was prepared in the same manner as in Example 4 with the exception of the use of an electrolyte in which 1 part by weight of 1,4-butanediol bis(2,2,2-trifluoroethanesulfonate) was added instead of 1 part by weight of 1,2,4-butanetriol trimethanesulfonate was used, and battery characteristic tests the same as in Example 4 were conducted. The results are shown in Table 3.

TABLE 3

| | Additive | Added amount part by weight | Positive electrode | Electrolyte composition | Capacity recovery (%) | Amount of gas generation (cc) |
|---|---|---|---|---|---|---|
| Example 6 | 1,4-butanediol bis(2,2,2-trifluoroethanesulfonate) | 1 | lithium nickel compound oxide | 1.25M $LiPF_6$/EC + EMC(1:3) + VC2% | 83.4 | 0.20 |
| Example 7 | 1,4-butanediol bis(2,2,2-trifluoroethanesulfonate) | 3 | lithium nickel compound oxide | 1.25M $LiPF_6$/EC + EMC(1:3) + VC2% | 82.7 | 0.20 |
| Example 8 | 1,4-butanediol bis(2,2,2-trifluoroethanesulfonate) | 5 | lithium nickel compound oxide | 1.25M $LiPF_6$/EC + EMC(1:3) + VC2% | 82.4 | 0.17 |
| Referential Example 2 | 1,4-butanediol bis(2,2,2-trifluoroethanesulfonate) | 1 | lithium nickel compound oxide | 1.0M $LiPF_6$/EC + DEC(1:1) | 83.8 | 0.21 |
| Example 9 | 1,4-butanediol bis(2,2,2-trifluoroethanesulfonate) | 1 | lithium cobalt compound oxide | 1.25M $LiPF_6$/EC + EMC(1:3) + VC2% | 80.6 | 0.08 |

Example 10

A lithium secondary battery was prepared in the same manner as in Example 5 with the exception of the use of an electrolyte in which 1 part by weight of 1,4-butanediol bis(2,2,2-trifluoroethanesulfonate) was added instead of 1 part by weight of 1,2,4-butanetriol trimethanesulfonate, and battery characteristic tests the same as in Example 4 were conducted. The amount of gas generation after 7 days of continuous charging was 0.46 ml.

Example 11

A base electrolyte (I) was prepared by adding 2 parts by weight of vinylene carbonate to 100 parts by weight of a mixed solvent of ethylene carbonate and ethyl methyl carbonate (mixing ratio of 1:3 by volume) containing $LiPF_6$ in a ratio of 1 mol/L. To the base electrolyte was added 1 part by weight of trimethylsilyl methanesulfonate to thereby form an electrolyte. Using the resulting electrolyte, a lithium secondary battery was prepared in the same manner as in Example 4.
[Capacity Evaluation]
The discharge capacity of lithium cobalt oxide per 1 hour was considered as 140 mAh/g and a discharge rate 1 C was determined based on the capacity and the weight of positive active material of the lithium secondary battery for evaluation to set a rate. Then, in a constant-temperature bath at 25° C., the battery was charged at 0.2 C to 4.2V and then discharged at 0.2 C to 3V to conduct initial formation. Thereafter, the battery was charged at 0.7 C to 4.2V and then again discharged at 1 C to 3V to determine an initial discharge capacity. In this connection, the cut current at the charging was set at 0.05 C.
[Continuous Charge Characteristic Evaluation]
(1) Amount of Gas Generation
The battery after subjected to the capacity evaluation test was placed in a constant-temperature bath at 60° C. and was charged at a constant current at 0.7 C and, when the voltage reached 4.25V, switched to constant-voltage charging. After 7 days of charging, the battery was immersed into an ethanol bath to measure buoyant force and the amount of gas generation was calculated from the buoyant force.

the base electrolyte (I), a lithium secondary battery was prepared in the same manner as in Example 11, and continuous charge characteristics evaluation was conducted. The results are shown in Table 4.

Comparative Example 6

Using the base electrolyte (I) itself, a lithium secondary battery was prepared in the same manner as in Example 11, and continuous charge characteristics evaluation and cycle characteristic evaluation were conducted. The results are shown in Table 4.

Comparative Example 7

Using an electrolyte obtained by adding 3 parts by weight of methyl methanesulfonate to 102 parts by weight of the base electrolyte (I), a lithium secondary battery was prepared in the same manner as in Example 11, and continuous charge characteristic evaluation was conducted. The results are shown in Table 4.

TABLE 4

| | Additive | Added amount part by weight | Electrolyte composition | After 7 days of continuous charging | | Capacity retention after 200 cycles (%) |
| --- | --- | --- | --- | --- | --- | --- |
| | | | | Amount of gas generation (ml) | Recovered 0.2 C capacity (mAh/g) | |
| Example 11 | trimethylsilyl methanesulfonate | 1 | 1M LiPF$_6$/EC + EMC(1:3) + VC2% | 0.51 | 122.2 | 89.4 |
| Example 12 | trimethylsilyl methanesulfonate | 3 | 1M LiPF$_6$/EC + EMC(1:3) + VC2% | 0.44 | 120.9 | — |
| Comparative Example 6 | none | — | 1M LiPF$_6$/EC + EMC(1:3) + VC2% | 0.73 | 117.8 | 78.9 |
| Comparative Example 7 | methyl methanesulfonate | 3 | 1M LiPF$_6$/EC + EMC(1:3) + VC2% | 0.71 | 114.9 | — |

(2) Recovered 0.2 C Capacity
In order to evaluate the degree of capacity deterioration after the continuous charging, after the measurement of the amount of gas generation, the battery was first discharged at 0.2 C to 3V and then charged at 0.7 C to 4.2V. Furthermore, it was discharged at 0.2 C and a discharge capacity at that time was measured. The larger the value is, the smaller the deterioration of the battery is.
[Cycle Characteristic Evaluation]
Charging and discharging, wherein the battery after subjected to the capacity evaluation test was charged at 0.7 C to 4.2V (cut current 0.05 C) in a constant-temperature bath at 25° C. and then discharged at 1 C to 3V, were repeated. 1 C discharge capacity after 200 cycles was measured and the capacity retention after 200 cycles was determined according to the following equation. The larger the value is, the smaller the deterioration of the battery during the charging/discharging cycles is.

Capacity retention(%)after 200 cycles=Discharge capacity after 200 cycles(mAh/g)/Initial discharge capacity(mAh/g)

The results are shown in Table 4.

Example 12

Using an electrolyte obtained by adding 3 parts by weight of trimethylsilyl methanesulfonate to 102 parts by weight of Example 13

A base electrolyte (II) was prepared by adding 2 parts by weight of vinylene carbonate to 100 parts by weight of a mixed solvent of ethylene carbonate and γ-butyrolactone (mixing ratio of 1:3 by volume) containing LiPF$_6$ in a ratio of 1 mol/L. To the base electrolyte was added 1 part by weight of trimethylsilyl methanesulfonate to thereby form an electrolyte.

Using the resulting electrolyte, a lithium secondary battery was prepared in the same manner as in Example 11, and cycle characteristic evaluation was conducted. The results are shown in Table 5.

Example 14

A lithium secondary battery was prepared in the same manner as in Example 13 as in Example 11 with the exception of the use of an electrolyte in which 3 parts by weight of trimethylsilyl methanesulfonate was added to 102 parts by weight of the base electrolyte (II), and cycle characteristic evaluation was conducted. The results are shown in Table 5.

Comparative Example 8

A lithium secondary battery was prepared in the same manner as in Example 11 using the base electrolyte (II) itself, and cycle characteristic evaluation was conducted. The results are shown in Table 5.

Comparative Example 9

A lithium secondary battery was prepared in the same manner as in Example 11 using an electrolyte obtained by adding 1 part by weight of methyl methanesulfonate to 102 parts by weight of the base electrolyte (II), and cycle characteristic evaluation was conducted. The results are shown in Table 5.

TABLE 5

| | Additive | Added amount part by weight | Electrolyte composition | Capacity retention after 200 cycles (%) |
|---|---|---|---|---|
| Example 13 | trimethylsilyl methanesulfonate | 1 | 1M LiPF$_6$/EC + GBL(1:3) + VC2% | 87.2 |
| Example 14 | trimethylsilyl methanesulfonate | 3 | 1M LiPF$_6$/EC + GBL(1:3) + VC2% | 86.6 |
| Comparative Example 8 | none | — | 1M LiPF$_6$/EC + GBL(1:3) + VC2% | 82.5 |
| Comparative Example 9 | methyl methanesulfonate | 1 | 1M LiPF$_6$/EC + GBL(1:3) + VC2% | 84.5 |

Example 15

A base electrolyte (III) was prepared by dissolving LiPF$_6$ in a ratio of 1 mol/L into a mixed solvent of ethylene carbonate and ethyl methyl carbonate (mixing ratio of 1:3 by volume). To the base electrolyte were added 1 part by weight of 1,4-thioxane-1,1-dioxide and 2 parts by weight of vinylene carbonate to thereby form an electrolyte.

Using the resulting electrolyte, a lithium secondary battery was prepared in the same manner in Example 4, and high-temperature storage characteristic evaluation and continuous charge characteristic evaluation were conducted.

[Capacity Evaluation]

The discharge capacity of lithium cobalt oxide per 1 hour was considered as 140 mAh/g and a discharge rate 1 C was determined based on the capacity and the weight of positive active material of the lithium secondary battery for evaluation to set a rate. Then, in a constant-temperature bath at 25° C., the battery was charged at 0.2 C to 4.2V and then discharged at 0.2 C to 3V to conduct initial formation. Thereafter, the battery was charged at 0.7 C to 4.2V and then again discharged at 0.2 C to 3V to determine an initial discharge capacity. The cut current at the charging was set at 0.05 C.

[High-Temperature Storage Characteristic Evaluation]

The battery after subjected to the capacity evaluation test was charged at 0.7 C to 4.2V (cut current 0.05 C) in a constant-temperature bath at 25° C. and then stored in a constant-temperature bath at 85° C. for 1 day. Thereafter, the battery was thoroughly cooled and then discharged at 0.2 C to 3V to determine a residual capacity after the high-temperature storage. Then, the battery was charged at 0.7 C to 4.2V (cut current 0.05 C) and then discharged at 0.2 C to 3V to measure a recovered capacity after the high-temperature storage.

According to the following equation, residual capacity retention and recovered capacity retention after the high-temperature storage were determined. The larger these values are, the smaller the self-discharge and the deterioration of the battery after the high-temperature storage are.

Residual capacity retention(%)after high-temperature storage=Residual capacity after high-temperature storage/Initial discharge capacity×100

Recovered capacity retention(%)after high-temperature storage=Recovered capacity after high-temperature storage/Initial discharge capacity×100

[Continuous Charge Characteristic Evaluation]

The battery after subjected to the capacity evaluation test was placed in a constant-temperature bath at 60° C. and was charged at a constant current at 0.7 C and, when the voltage reached 4.25V, switched to constant-voltage charging. After 7 days of charging, in order to evaluate the degree of capacity deterioration after the continuous charging, the battery was first discharged at 0.2 C to 3V and then charged at 0.7 C to 4.2V. Furthermore, it was discharged at 0.2 C to 3V and a discharge capacity at that time (recovered capacity) was measured.

According to the following equation, a recovered capacity retention after the continuous charging was determined. The larger the value is, the smaller the deterioration of the battery is.

Recovered capacity retention(%)after 7 days of continuous charging=Recovered capacity after 7 days of continuous charging/Initial discharge capacity×100

The results are shown in Table 6.

Example 16

Using an electrolyte obtained by adding 1 part by weight of 1,4-thioxane-1,1-dioxide and 1 part by weight of vinylene carbonate to 100 parts by weight of the base electrolyte (III), a lithium secondary battery was prepared in the same manner as in Example 15, and high-temperature storage characteristic evaluation and continuous charge characteristic evaluation were conducted. The results are shown in Table 6.

Example 17

Using an electrolyte obtained by adding 1 part by weight of 1,4-thioxane-1,1-dioxide and 0.5 part by weight of vinylethylene carbonate to 100 parts by weight of the base electrolyte (III), a lithium secondary battery was prepared in the same manner as in Example 15, and high-temperature storage characteristic evaluation and continuous charge characteristic evaluation were conducted. The results are shown in Table 6.

Comparative Example 10

Using the base electrolyte (III) itself, a lithium secondary battery was prepared in the same manner as in Example 15, and high-temperature storage characteristic evaluation and continuous charge characteristic evaluation were conducted. The results are shown in Table 6.

Comparative Example 11

Using an electrolyte obtained by adding 1 part by weight of 1,4-thioxane-1,1-dioxide to 100 parts by weight of the base electrolyte (III), a lithium secondary battery was prepared in the same manner as in Example 15, and high-temperature storage characteristic evaluation and continuous charge characteristic evaluation were conducted. The results are shown in Table 6.

Example 18

Using an electrolyte obtained by adding 3 parts by weight of 1,4-thioxane-1,1-dioxide and 2 parts by weight of vinylene carbonate to 100 parts by weight of the base electrolyte (III), a lithium secondary battery was prepared in the same manner as in Example 15, and high-temperature storage characteristic evaluation and continuous charge characteristic evaluation were conducted. The results are shown in Table 6.

Comparative Example 12

Using an electrolyte obtained by adding 3 parts by weight of 1,4-thioxane-1,1-dioxide to 100 parts by weight of the base electrolyte (III), a lithium secondary battery was prepared in the same manner as in Example 15, and high-temperature storage characteristic evaluation and continuous charge characteristic evaluation were conducted. The results are shown in Table 6.

Comparative Example 13

Using an electrolyte obtained by adding 2 parts by weight of vinylene carbonate to 100 parts by weight of the base electrolyte (III), a lithium secondary battery was prepared in the same manner as in Example 15, and high-temperature storage characteristic evaluation and continuous charge characteristic evaluation were conducted. The results are shown in Table 6.

Example 20

A base electrolyte (IV) was prepared by dissolving $LiPF_6$ in a ratio of 1 mol/L into a mixed solvent of ethylene carbonate (EC) and γ-butyrolactone (GBL) (mixing ratio of 1:3 by volume). Using an electrolyte obtained by adding 1 part by weight of 1,4-thioxane-1,1-dioxide and 2 parts by weight of vinylene carbonate to the base electrolyte (IV), a lithium secondary battery was prepared in the same manner in Example 15, and high-temperature storage characteristic evaluation and continuous charge characteristic evaluation were conducted. The results are shown in Table 6.

TABLE 6

| | Additive | | Unsaturated carbonate | | | Residual capacity retention after high-temperature storage (%) | Recovered capacity retention after high-temperature storage (%) | Recovered capacity retention after 7 days of continuous charging (%) |
| --- | --- | --- | --- | --- | --- | --- | --- | --- |
| | Compound | Content part by weight | Compound | Content part by weight | Electrolyte composition | | | |
| Example 15 | 1,4-thioxane-1,1-dioxide | 1 | vinylene carbonate | 2 | 1M $LiPF_6$/EC + EMC(1:3) | 85.9 | 93.1 | 88.2 |
| Example 16 | 1,4-thioxane-1,1-dioxide | 1 | vinylene carbonate | 1 | 1M $LiPF_6$/EC + EMC(1:3) | 86.3 | 92.1 | 89.0 |
| Example 17 | 1,4-thioxane-1,1-dioxide | 1 | vinyl-ethylene carbonate | 0.5 | 1M $LiPF_6$/EC + EMC(1:3) | 86.0 | 91.1 | 87.7 |
| Comparative Example 10 | none | — | none | — | 1M $LiPF_6$/EC + EMC(1:3) | 81.7 | 86.7 | 85.3 |
| Comparative Example 11 | 1,4-thioxane-1,1-dioxide | 1 | none | — | 1M $LiPF_6$/EC + EMC(1:3) | 82.3 | 88.6 | 85.2 |
| Example 18 | 1,4-thioxane-1,1-dioxide | 3 | vinylene carbonate | 2 | 1M $LiPF_6$/EC + EMC(1:3) | 87.4 | 91.2 | 85.3 |
| Comparative Example 12 | 1,4-thioxane-1,1-dioxide | 3 | none | — | 1M $LiPF_6$/EC + EMC(1:3) | 81.2 | 86.7 | 62.7 |
| Example 19 | 1,4-thioxane-1,1-dioxide | 0.5 | vinylene carbonate | 2 | 1M $LiPF_6$/EC + EMC(1:3) | 87.5 | 92.2 | 88.3 |
| Comparative Example 13 | none | — | vinylene carbonate | 2 | 1M $LiPF_6$/EC + EMC(1:3) | 81.7 | 88.2 | 81.8 |
| Example 20 | 1,4-thioxane-1,1-dioxide | 1 | vinylene carbonate | 2 | 1M $LiPF_6$/EC + GBL(1:3) | 85.3 | 92.2 | 87.6 | the same manner as in Example 15, and high-temperature storage characteristic evaluation and continuous charge characteristic evaluation were conducted. The results are shown in Table 6.

Example 19

Using an electrolyte obtained by adding 0.5 part by weight of 1,4-thioxane-1,1-dioxide and 2 parts by weight of vinylene carbonate to 100 parts by weight of the base electrolyte (III), a lithium secondary battery was prepared in the same manner Example 21

Using an electrolyte the same as in Example 15, a lithium secondary battery was prepared, and continuous charge characteristic evaluation the same as in Example 15 was conducted. Thereafter, the battery was immersed into an ethanol bath to measure buoyant force and the amount of gas generation was calculated from the buoyant force. The amount of gas generation after 7 days of continuous charging was 0.54 ml.

Example 22

Production of Negative Electrode

With 95 parts by weight of natural graphite powder having a "d" value for a lattice plane (002 plane), as determined by X-ray diffraction, of 0.336 nm, a crystallite size (Lc) of 652 nm, an ash content of 0.07% by weight, a median diameter as determined by the laser diffraction/scattering method of 12 μm, a specific surface area as determined by BET method of 7.5 m$^2$/g, and an "R" value (=$I_B/I_A$) of 0.12 as determined by Raman spectroscopy with an argon ion laser light, and a half-band width of the peak appearing in the 1,570-1,620 cm$^{-1}$ range of 19.9 cm$^{-1}$ was mixed 6 parts by weight of polyvinylidene fluoride, and N-methyl-2-pyrrolidone was added thereto to form a slurry.

This slurry was applied evenly onto one surface of a copper foil having a thickness of 18 μm. After the coating was dried, the dried product was pressed so that the density of the negative active layer becomes 1.5 g/cm$^3$ to form a negative electrode.

[Production of Positive Electrode]

There are mixed 85% by weight of LiCoO$_2$, 6% by weight of carbon black, and 9% by weight of polyvinylidene fluoride (trade name "KF-1000"; manufactured by Kureha Chemical Co., Ltd.). N-Methyl-2-pyrrolidone was added thereto to prepare a slurry. This slurry was applied evenly on both surfaces of an aluminum foil having a thickness of 20 μm. After the coating was dried, the dried product was pressed so that the density of the positive active layer becomes 3.0 g/cm$^3$ to form a positive electrode.

[Production of Lithium Secondary Battery]

The above positive electrode, negative electrode, and a separator made of polyethylene were laminated in the order of the negative electrode, the separator, the positive electrode, the separator, and the negative electrode to prepare a cell element. The cell element was inserted into a bag made of a laminate film obtained by covering both surfaces of an aluminum (thickness 40 μm) with resin layers, while the terminals of the positive electrode and the negative electrode was provided in an extended condition, and then the electrolyte to be mentioned below was introduced into the bag, which was vacuum-sealed to prepare a sheet-form lithium secondary battery.

[Capacity Evaluation]

In order to enhance the adhesiveness between the electrodes, while the lithium secondary battery was put between glass plates, the battery was charged at a constant current corresponding to 0.2 C to 4.2V and then discharged at a constant current of 0.2 C to 3V. This cycle was repeated three times to stabilize the battery. At the fourth cycle, the battery was charged at a constant current of 0.5 C to 4.2V and then charged at a constant voltage of 4.2V until the current value reached 0.05 C and the battery was then discharged at 0.2 C to 3V to determined an initial discharge capacity.

[Continuous Charge Characteristic Evaluation]

The battery after subjected to the capacity evaluation test was immersed into an ethanol bath to measure a volume and was charged at a constant current of 0.7 C at 60° C. and, when the voltage reached 4.25V, switched to a constant-voltage charging, followed by one week of continuous charging.

After cooling, the battery was immersed into an ethanol bath to measure a volume and the amount of gas was determined from the volume change before and after the continuous charging.

After the measurement of the amount of gas generation, the battery was discharged at a constant current of 0.2 C to 3V and a residual capacity after the continuous charging test was measured to determine a residual capacity after the continuous charging, the discharge capacity before the continuous charging test being taken as 100.

[High-Temperature Storage Characteristic Evaluation]

The battery after subjected to the capacity evaluation test was charged at a constant current of 0.5 C to 4.2V and then charged at a constant voltage of 4.2 V until the current value reached 0.05 C. Thereafter, the battery was stored at 85° C. for 3 days. The battery was thoroughly cooled and then discharged at a constant current of 0.2 C to 3 V at 25° C. to determine a residual capacity after the storage test, the discharge capacity before the storage being taken as 100.

[Cycle Characteristic Evaluation]

The battery after subjected to the capacity evaluation test was subjected to a cycle test wherein the battery was charged at a constant current of 0.5 C to 4.2 V at 25° C., then charged at a constant voltage of 4.2 V until the current value reached 0.05 C, and discharged at a constant current of 1 C to 3 V. The discharge capacity after 200 cycles was determined, the discharge capacity before the cycle test being taken as 100.

[Blending of Electrolyte]

Under a dry argon atmosphere, 2 parts by weight of vinylene carbonate and 1 part by weight of N,N-dimethylmethanesulfonamide were added to 97 parts by weight of a mixture of ethylene carbonate and ethyl methyl carbonate (volume ratio 3:7) and then thoroughly dried LiPF$_6$ was dissolved therein so as to achieve a ratio of 1.0 mol/L, whereby an electrolyte was prepared.

Using the resulting electrolyte, a lithium secondary battery was prepared and continuous charge characteristics, high-temperature storage characteristics, and cycle characteristics were evaluated. The results of the evaluation of continuous charge characteristics and high-temperature storage characteristics are shown in Table 7. The results of the evaluation of cycle characteristics are shown in Table 8.

Referential Example 3

One part by weight of N,N-dimethylmethanesulfonamide was added to 99 parts by weight of a mixture of ethylene carbonate and ethyl methyl carbonate (volume ratio 3:7) and then thoroughly dried LiPF$_6$ was dissolved therein so as to achieve a ratio of 1.0 mol/L, whereby an electrolyte was prepared.

Using the resulting electrolyte, a lithium secondary battery was prepared in the same manner as in Example 22 and continuous charge characteristics, high-temperature storage characteristics, and cycle characteristics were evaluated. The results of the evaluation of continuous charge characteristics and high-temperature storage characteristics are shown in Table 7. The results of the evaluation of cycle characteristics are shown in Table 8.

Comparative Example 14

Using an electrolyte obtained by dissolving thoroughly dried LiPF$_6$ into a mixture of ethylene carbonate and ethyl methyl carbonate (volume ratio 3:7) so as to achieve a ratio of 1.0 mol/L, a lithium secondary battery was prepared in the same manner as in Example 22, and then continuous charge characteristics, high-temperature storage characteristics, and cycle characteristics were evaluated. The results of the evaluation of continuous charge characteristics and high-temperature storage characteristics are shown in Table 7. The results of the evaluation of cycle characteristics are shown in Table 8.

Comparative Example 15

One part by weight of 1,1-sulfonyldiimidazole was added to 99 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22, and continuous charge characteristics and high-temperature storage characteristics were evaluated. The results are shown in Table 7.

Comparative Example 16

Two parts by weight of vinylene carbonate was added to 98 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22 and continuous charge characteristics, high-temperature storage characteristics, and cycle characteristics were evaluated. The results of the evaluation of continuous charge characteristics and high-temperature storage characteristics are shown in Table 7. The results of the evaluation of cycle characteristics are shown in Table 8.

Comparative Example 17

Two parts by weight of vinylene carbonate and 1 part by weight of 1,1-sulfonyldiimidazole were added to 97 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22, and continuous charge characteristics and high-temperature storage characteristics were evaluated. The results are shown in Table 7.

Comparative Example 18

Two parts by weight of vinylene carbonate and 1 part by weight of 1-p-tolylsulfonylpyrrole were added to 97 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22, and continuous charge characteristics and high-temperature storage characteristics were evaluated. The results are shown in Table 7.

Example 23

Two parts by weight of vinylene carbonate and 0.5 part by weight of N,N-dimethylmethanesulfonamide were added to 97.5 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22, and continuous charge characteristics and high-temperature storage characteristics were evaluated. The results are shown in Table 7.

Example 24

Two parts by weight of vinylene carbonate and 0.5 part by weight of N,N-dimethylethanesulfonamide were added to 97.5 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22, and continuous charge characteristics and high-temperature storage characteristics were evaluated. The results are shown in Table 7.

Example 25

Two parts by weight of vinylene carbonate and 0.5 part by weight of N,N-dibutylbenzenesulfonamide were added to 97.5 parts by weight of a mixture of ethylene carbonate and ethyl methyl carbonate (volume ratio 3:7) and then thoroughly dried $LiPF_6$ was dissolved therein so as to achieve a ratio of 1.0 mol/L, whereby an electrolyte was prepared.

Using the electrolyte, a lithium secondary battery was prepared in the same manner as in Example 22, and continuous charge characteristics and high-temperature storage characteristics were evaluated. The results are shown in Table 7.

TABLE 7

| | Additive | | Unsaturated carbonate | | | Residual | |
| --- | --- | --- | --- | --- | --- | --- | --- |
| | Compound | Content part by weight | Compound | Content part by weight | Amount of gas generation (ml) | capacity after continuous charging (%) | Residual capacity after storage (%) |
| Example 22 | N,N-dimethylmethane-sulfonamide | 1 | vinylene carbonate | 2 | 0.43 | 94 | 80 |
| Referential Example 3 | N,N-dimethylmethane-sulfonamide | 1 | none | — | 0.34 | 90 | 73 |
| Comparative Example 14 | — | — | none | — | 0.41 | 88 | 69 |
| Comparative Example 15 | 1,1'-sulfonyl-diimidazole | 1 | none | — | 0.25 | 79 | 65 |
| Comparative Example 16 | — | — | vinylene carbonate | 2 | 0.67 | 84 | 75 |
| Comparative Example 17 | 1,1'-sulfonyl-diimidazole | 1 | vinylene carbonate | 2 | 0.53 | 85 | 72 |
| Comparative Example 18 | 1-p-tolylsulfonyl-pyrrole | 1 | vinylene carbonate | 2 | 0.56 | 46 | 67 |
| Example 23 | N,N-dimethylmethane-sulfonamide | 0.5 | vinylene carbonate | 2 | 0.39 | 96 | 81 |

TABLE 7-continued

| | Additive | | Unsaturated carbonate | | Residual | | |
|---|---|---|---|---|---|---|---|
| | Compound | Content part by weight | Compound | Content part by weight | Amount of gas generation (ml) | capacity after continuous charging (%) | Residual capacity after storage (%) |
| Example 24 | N,N-dimethylethane-sulfonamide | 0.5 | vinylene carbonate | 2 | 0.44 | 92 | 80 |
| Example 25 | N,N-dibutylbenzene-Sulfonamide | 0.5 | vinylene carbonate | 2 | 0.50 | 98 | 81 |

TABLE 8

| | Discharge capacity after 200 cycles (%) |
|---|---|
| Example 22 | 90 |
| Referential Example 3 | 82 |
| Comparative Example 14 | 80 |
| Comparative Example 16 | 90 |

Example 26

Two parts by weight of vinylene carbonate and 3 part by weight of fluorobenzene were added to 95 parts by weight of a mixture of ethylene carbonate and ethyl methyl carbonate (volume ratio 3:7) and then thoroughly dried LiPF$_6$ was dissolved therein so as to achieve a ratio of 1.0 mol/L, whereby an electrolyte was prepared.

Using the electrolyte, a lithium secondary battery was prepared in the same manner as in Example 22.

Comparative Example 19

Thoroughly dried LiPF$_6$ was dissolved into a mixture of ethylene carbonate and ethyl methyl carbonate (volume ratio 3:7) so as to achieve a ratio of 1.0 mol/L, whereby an electrolyte was prepared. A sheet-form battery was prepared in the same manner as in Example 26 with the exception that the electrolyte was used.

Comparative Example 20

Two parts by weight of vinylene carbonate was added to 98 parts by weight of a mixture of ethylene carbonate and ethyl methyl carbonate (volume ratio 3:7), and then thoroughly dried LiPF$_6$ was dissolved therein so as to achieve a ratio of 1.0 mol/L, whereby an electrolyte was prepared. A sheet-form battery was prepared in the same manner as in Example 26 with the exception that the electrolyte was used.

Comparative Example 21

Two parts by weight of vinylene carbonate and 5 parts by weight of trimethyl phosphate were added to 93 parts by weight of a mixture of ethylene carbonate and ethyl methyl carbonate (volume ratio 3:7), and then thoroughly dried LiPF$_6$ was dissolved therein so as to achieve a ratio of 1.0 mol/L, whereby an electrolyte was prepared. A sheet-form battery was prepared in the same manner as in Example 26 with the exception that the electrolyte was used.

Example 27

Two parts by weight of vinylene carbonate and 3 parts by weight of fluorobenzene were added to 95 parts by weight of a mixture of ethylene carbonate and ethyl methyl carbonate (volume ratio 3:7), and then thoroughly dried LiPF$_6$ was dissolved therein so as to achieve a ratio of 1.0 mol/L and LiN(CF$_3$SO$_2$)$_2$ was dissolved therein so as to achieve a ratio of 0.1 mol/L, whereby an electrolyte was prepared. A sheet-form battery was prepared in the same manner as in Example 26 with the exception that the electrolyte was used.

Example 28

Two parts by weight of vinylene carbonate, 3 parts by weight of fluorobenzene, and 1 part by weight of cyclohexylbenzene were added to 94 parts by weight of a mixture of ethylene carbonate and ethyl methyl carbonate (volume ratio 3:7), and then thoroughly dried LiPF$_6$ was dissolved therein so as to achieve a ratio of 1.0 mol/L, whereby an electrolyte was prepared. A sheet-form battery was prepared in the same manner as in Example 26 with the exception that the electrolyte was used.

Comparative Example 22

Two parts by weight of vinylene carbonate and 1 part by weight of cyclohexylbenzene were added to 97 parts by weight of a mixture of ethylene carbonate and ethyl methyl carbonate (volume ratio 3:7), and then thoroughly dried LiPF$_6$ was dissolved therein so as to achieve a ratio of 1.0 mol/L, whereby an electrolyte was prepared. A sheet-form battery was prepared in the same manner as in Example 26 with the exception that the electrolyte was used.

Example 29

In Example 26, the product pressed to have a density of the negative electrode layer of 1.5 g/cm$^3$ by a pressing machine was punched out to obtain a disk having a diameter of 12.5 mm, which was used as a negative electrode. As for a positive electrode, the positive active material-containing slurry prepared in Example 26 was evenly applied onto one surface of an aluminum foil having a thickness of 20 μm as a current collector for the positive electrode and dried, and then pressed by a pressing machine so that the density of the positive electrode layer became 3.0 g/cm$^3$, followed by punching out the coated one to obtain a disk having a diameter of 12.5 mm, which was used as the positive electrode.

Under a dry argon atmosphere, 1 part by weight of vinylene carbonate, 1 part by weight of vinylethylene carbonate and 7 parts by weight of fluorobenzene were added to 91 parts by weight of a mixture of ethylene carbonate and γ-butyrolactone (volume ratio 3:7), and then thoroughly dried LiBF$_4$ was dissolved therein so as to achieve a ratio of 1.5 mol/L, whereby an electrolyte was prepared.

The positive electrode was placed in a stainless-steel can serving also as a positive-electrode conductor. Thereon was placed the negative electrode impregnated with the electrolyte via a polyethylene separator impregnated with the electrolyte. This can was caulked and sealed with a seal plate serving also as a negative-electrode conductor via a gasket for insulation to prepare a coin-shaped battery. Therein, the impregnation of battery members with the electrolyte was conducted by immersing each member in the electrolyte for 2 minutes.

Comparative Example 23

One part by weight of vinylene carbonate and 1 part by weight of vinylethylene carbonate were added to 98 parts by weight of a mixture of ethylene carbonate and γ-butyrolactone (volume ratio 3:7), and then $LiBF_4$ was dissolved therein so as to achieve a ratio of 1.5 mol/L, whereby an electrolyte was prepared. A coin-shaped battery was prepared in the same manner as in Example 29 with the exception that the electrolyte was used.

Comparative Example 24

One part by weight of vinylene carbonate and 1 part by weight of vinylethylene carbonate were added to 98 parts by weight of a mixture of ethylene carbonate, γ-butyrolactone, and ethyl methyl carbonate (volume ratio 3:5:2), and then $LiBF_4$ was dissolved therein so as to achieve a ratio of 1.5 mol/L, whereby an electrolyte was prepared. A coin-shaped battery was prepared in the same manner as in Example 29 with the exception that the electrolyte was used.

[Battery Evaluation]

In order to enhance the adhesiveness between the electrodes, while the lithium secondary battery was put between glass plates, each of the batteries of Examples 26 to 28 and Comparative Examples 19 to 22 was charged at a constant current corresponding to 0.2 C to a final voltage of 4.2 V and then discharged to a final voltage of 3V. This cycle was repeated three times to stabilize the battery. At the fourth cycle, the battery was subjected to 4.2 V-constant-current constant-voltage charging (CCCV charge) (0.05 C cut) wherein it was charged at a current corresponding to 0.5 C to a final voltage of 4.2 V and then charged until the current value reached a current value corresponding to 0.05 C.

Thereafter, the battery was discharged at a constant current corresponding to 0.2 C to 3 V. Further, continuous charging of 4.2 V-CCCV at 60° C. was conducted for 2 weeks.

Before and after the continuous charge test at 4.2 V-CCCCV at 60° C., the sheet-form battery was immersed into an ethanol bath and the amount of gas generation was determined from the change of the buoyant force.

Moreover, with regard to the batteries of Examples 26 and 27 and Comparative Examples 19 to 21, after the buoyant force measurement, each of the batteries was discharged at a constant current of 0.2 C to a final discharge voltage of 3 V at 25° C. to measure a residual capacity after the continuous charge test.

Then, after charging at 4.2 V-CCCCV (0.05 C cut) and discharging at a constant current of 0.2 C to a final discharge voltage of 3 V, the battery was charged under the same CCCV conditions and discharged at a current value corresponding to 1.5 C to 3 V to measure high-load discharge characteristics. Therein, 1 C means a current value at which the battery can be fully charged over a period of 1 hour and 1.5 C means the current value that is 1.5 times as much as 1 C.

The amount of gas generation, the residual capacity after the continuous charging when the discharge capacity before the continuous charging is taken as 100, and the capacity at the high-load discharging are shown in Table 9.

TABLE 9

| | Amount of gas generation (ml) | Residual capacity (%) | High-load discharge capacity (%) |
|---|---|---|---|
| Example 26 | 0.38 | 93.4 | 80.4 |
| Comparative Example 19 | 0.53 | 86.3 | 79.1 |
| Comparative Example 20 | 0.92 | 91.5 | 75.8 |
| Comparative Example 21 | 0.61 | 91.5 | 23.9 |
| Example 27 | 0.32 | 93.7 | 81.7 |
| Example 28 | 1.18 | — | — |
| Comparative Example 22 | 1.57 | — | — |

Each of the batteries of Example 29 and Comparative Examples 23 and 24 was charged at a constant current of 0.5 mA to a final voltage of 4.2 V and then discharged to a final voltage of 3V. This cycle was repeated three times to stabilize the battery. Then, a cycle test was conducted, wherein the battery was subjected to 4.2 V-CCCV charge (0.05 C cut) that includes charge at a current corresponding to 0.7 C to a final voltage of 4.2 V and subsequent charge until the current value reached a current value corresponding to 0.05 C, and then subjected to discharge at a constant current corresponding to 1 C to a final discharge voltage of 3 V. The capacity at the 50th cycle is shown in Table 10, the discharge capacity at the fourth cycle being taken as 100.

TABLE 10

| | Capacity after 50 cycles (%) |
|---|---|
| Example 29 | 91.2 |
| Comparative Example 23 | impossible to charge |
| Comparative Example 24 | 87.3 |

Moreover, when the amount of gases (total amount of methane, ethane, ethylene, CO, and $CO_2$ generated) inside the battery after 50 cycles was measured by gas chromatography, the amount of gases in the battery of Example 29 was found to be 77, the amount of gases in the battery of Comparative Example 24 being taken as 100.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 8, 2002 (Patent Application No. 2002-063545), a Japanese patent application filed on Mar. 8, 2002 (Patent Application No. 2002-063547), a Japanese patent application filed on Aug. 21, 2002 (Patent Application No. 2002-240382), a Japanese patent application filed on Oct. 10, 2002 (Patent Application No. 2002-297359), a Japanese patent application filed on Jan. 9, 2003 (Patent Application No. 2003-003268), and a Japanese patent application filed on Feb. 6, 2003 (Patent Application No. 2003-029983), the entire contents thereof being hereby incorporated by reference.

INDUSTRIAL APPLICABILITY

According to the invention, it is possible to prepare a battery of high capacity that is excellent in storage characteristics, load characteristics, and, in case of a secondary battery, cycle characteristics and continuous charge characteristics and that reduces gas generation, and thus size reduction and enhanced performance of a nonaqueous electrolyte battery can be achieved.

What we claim is:

1. A nonaqueous electrolyte which comprises a nonaqueous organic solvent and a lithium salt dissolved therein, wherein the nonaqueous organic solvent comprises a sulfonic compound represented by formula (5) and 0.01 to 8% by weight of at least one compound selected from the group consisting of an acid anhydride and a carbonic ester having an unsaturated bond or a mixture thereof:

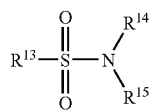

(5)

wherein each of $R^{13}$ to $R^{15}$ independently represents an alkyl group having 1 to 12 carbon atoms which may be substituted with fluorine atom(s), an alkenyl group having 2 to 12 carbon atoms which may be substituted with fluorine atom(s), an aryl group having 6 to 12 carbon atoms which may be substituted with fluorine atom(s), or $R^{14}$ and $R^{15}$ may be combined with each other to form a nitrogen-containing aliphatic ring or $R^{13}$ and $R^{14}$ may be combined with each other to form a cyclic structure, wherein the total content of the sulfonic compound represented by formula (5) is from 0.01% to 3% by weight based on the nonaqueous electrolyte.

2. The nonaqueous electrolyte according to claim 1, wherein in the compound of formula (5) each of $R^{13}$ to $R^{15}$ independently represents an alkyl group having 1 to 8 carbon atoms which may be substituted with fluorine atom(s), an alkenyl group having 2 to 8 carbon atoms which may be substituted with fluorine atom(s), an aryl group having 6 to 12 carbon atoms which may be substituted with fluorine atom(s), or $R^{14}$ and $R^{15}$ may be combined with each other to form a nitrogen-containing aliphatic ring or $R^{13}$ and $R^{14}$ may be combined with each other to form a cyclic structure.

3. The nonaqueous electrolyte according to claim 1, wherein in the compound of formula (5) each of $R^{13}$ to $R^{15}$ independently represents a methyl group, an ethyl group, an n-propyl group, an i-propyl group, an n-butyl group, an i-butyl group, a sec-butyl group, a tert-butyl group, a pentyl group, a vinyl group, a propenyl group, a phenyl group, a tolyl group, or a xylyl group, each of which may be substituted with fluorine atom(s).

4. The nonaqueous electrolyte according to claim 1, wherein the total content of the sulfonic compound represented by formula (5) is 0.01 to 1% by weight based on the nonaqueous electrolyte.

5. The nonaqueous electrolyte according to claim 1, wherein the total content of the sulfonic compound represented by formula (5) is 0.05 to 3% by weight based on the nonaqueous electrolyte.

6. The nonaqueous electrolyte according to claim 1, wherein the total content of the sulfonic compound represented by formula (5) is 0.1 to 3% by weight based on the nonaqueous electrolyte.

7. The nonaqueous electrolyte according to claim 1, wherein said nonaqueous organic solvent comprises at least one carbonic ester having an unsaturated bond.

8. The nonaqueous electrolyte according to claim 1, wherein said nonaqueous organic solvent comprises at least one acid anhydride.

9. A lithium secondary battery employing the nonaqueous electrolyte according to claim 1.

* * * * *